US012691560B2

(12) United States Patent
Wechselberger et al.

(10) Patent No.: US 12,691,560 B2
(45) Date of Patent: Jul. 28, 2026

(54) GAS SPRING-POWERED FASTENER DRIVER

(71) Applicant: MILWAUKEE ELECTRIC TOOL CORPORATION, Brookfield, WI (US)

(72) Inventors: Marcus M. Wechselberger, Milwaukee, WI (US); Andrew J. Weber, Cudahy, WI (US); David A. Bierdeman, New Berlin, WI (US); Jeremy J. Keifenheim, West Bend, WI (US); Sathish Xavier, Brookfield, WI (US); Jacob N. Zimmerman, Pewaukee, WI (US); David C. Graf, Greendale, WI (US); Garrett J. Kocourek, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 19/016,211

(22) Filed: Jan. 10, 2025

(65) Prior Publication Data

US 2025/0229396 A1 Jul. 17, 2025

Related U.S. Application Data

(60) Provisional application No. 63/718,005, filed on Nov. 8, 2024, provisional application No. 63/620,242, filed on Jan. 12, 2024.

(51) Int. Cl.
*B25C 1/04* (2006.01)
*B25C 1/00* (2006.01)
*B25C 1/06* (2006.01)

(52) U.S. Cl.
CPC .............. *B25C 1/047* (2013.01); *B25C 1/005* (2013.01); *B25C 1/06* (2013.01)

(58) Field of Classification Search
CPC .................................. B25C 1/047; B25C 5/10
See application file for complete search history.

(56) References Cited

U.S. PATENT DOCUMENTS 860,536 A * 7/1907 Ellingham .............. F16H 55/10
74/465
1,064,551 A 6/1913 Schugart
(Continued)

FOREIGN PATENT DOCUMENTS

CN 2100290 U 4/1992
CN 1997488 A 7/2007
(Continued)

*Primary Examiner* — Gloria R Weeks
(74) *Attorney, Agent, or Firm* — Michael Best & Friedrich LLP

(57) ABSTRACT

A powered fastener driver including a driver blade movable from a top-dead-center position to a bottom-dead-center position for driving a fastener into a workpiece. A driver may include a lifting assembly for providing torque to move the driver blade from the bottom-dead-center position toward the top-dead-center position, the lifting assembly including a rotary lifter configured to be selectively engageable with the driver blade, the rotary lifter having a plurality of lift pins and a roller disposed on at least one of the lift pins, wherein the roller includes a plurality of cam portions defined by cup-shaped recesses having a first radius oriented parallel to a rotational direction of the roller and a second radius perpendicular to the first radius, and wherein the driver blade includes a lift tooth having a crown disposed thereon, the crown configured to be engaged with at least one of the plurality of cam portions.

19 Claims, 26 Drawing Sheets

(56) References Cited

U.S. PATENT DOCUMENTS 1,758,603 A 5/1930 Helenbolt
2,473,868 A 6/1949 Domke
2,572,276 A 10/1951 Moe
2,575,455 A * 11/1951 Lang ........................ B25C 1/06 227/138
2,590,994 A 4/1952 McKay
3,241,216 A 3/1966 Wellendorf
3,589,588 A * 6/1971 Vasku ...................... B25C 1/06 227/132
3,847,322 A * 11/1974 Smith ...................... B25C 1/06 227/132
3,934,688 A 1/1976 Sides et al.
4,349,938 A 9/1982 Fontana
4,502,353 A 3/1985 Beaudoin
4,519,535 A 5/1985 Crutcher
5,174,485 A 12/1992 Meyer
5,503,319 A * 4/1996 Lai ........................... B25C 5/15 227/132
5,586,639 A 12/1996 Yoshino
5,931,112 A 8/1999 Lacan
6,983,871 B2 * 1/2006 Shima ...................... B25C 1/08 227/8
6,997,367 B2 * 2/2006 Hu ........................... B25C 5/15 173/202
7,451,903 B2 * 11/2008 Aihara .................... B25C 1/042 227/8
7,506,788 B2 3/2009 Liang et al.
7,575,142 B2 8/2009 Liang et al.
8,011,441 B2 9/2011 Leimbach et al.
8,011,547 B2 9/2011 Leimbach et al.
8,230,941 B2 7/2012 Leimbach et al.
8,267,296 B2 * 9/2012 Leimbach ................. B25C 1/06 60/407
8,267,297 B2 9/2012 Leimbach et al.
8,286,722 B2 10/2012 Leimbach et al.
8,387,718 B2 3/2013 Leimbach et al.
8,602,282 B2 12/2013 Leimbach et al.
8,763,874 B2 * 7/2014 McCardle ................. B25C 1/06 227/129
9,221,162 B2 * 12/2015 Kitagawa ................ B25C 1/008
9,408,606 B2 8/2016 Shelton, IV
9,463,561 B2 10/2016 Franz
9,676,088 B2 6/2017 Leimbach et al.
9,776,312 B2 10/2017 Franz
9,868,196 B2 1/2018 Chien
10,173,310 B2 * 1/2019 Wyler ...................... B25C 1/06
10,363,650 B2 7/2019 Miyashita et al.
10,730,172 B2 8/2020 Po
10,875,166 B2 * 12/2020 Ueda ....................... B25F 5/006
10,898,994 B2 * 1/2021 Carrier .................... B25C 1/047
11,331,781 B2 5/2022 Bierdeman et al.
11,571,794 B2 * 2/2023 Bierdeman ............... B25C 1/06
11,667,018 B2 6/2023 Tan et al.
11,752,609 B2 * 9/2023 Baba ....................... B25C 1/047 227/8
11,845,167 B2 * 12/2023 Leimbach ............... B25C 1/047
12,172,274 B2 12/2024 Wechselberger et al.
12,420,393 B2 * 9/2025 Leimbach ............... B25C 1/047
2004/0232194 A1 11/2004 Pedicini et al.
2005/0082334 A1 * 4/2005 Hu ........................... B25C 1/06 227/132
2005/0242154 A1 11/2005 Leimbach
2006/0180631 A1 * 8/2006 Pedicini .................... B25C 1/06 227/8
2007/0210134 A1 9/2007 Oda et al.
2008/0190986 A1 8/2008 Chang et al.
2009/0090759 A1 4/2009 Leimbach et al.
2009/0095787 A1 4/2009 Liang et al.
2011/0248062 A1 10/2011 Fujimoto
2011/0290846 A1 * 12/2011 Leimbach ............... B25C 1/041 227/8
2012/0325887 A1 12/2012 Wolf
2015/0158160 A1 6/2015 Kato
2016/0096259 A1 4/2016 Pedicini
2016/0288305 A1 * 10/2016 McCardle ................. B25C 1/06
2017/0190037 A1 7/2017 Sato et al.
2017/0266796 A1 9/2017 Leimbach et al.
2018/0036870 A1 2/2018 Komazaki et al.
2018/0126527 A1 5/2018 Pomeroy et al.
2018/0126528 A1 5/2018 Pomeroy et al.
2018/0126530 A1 5/2018 Pomeroy et al.
2018/0154505 A1 6/2018 Sato et al.
2019/0091845 A1 3/2019 Wyler et al.
2019/0202042 A1 7/2019 Wu et al.
2020/0114500 A1 * 4/2020 Bierdeman ............. B25C 1/047
2020/0164498 A1 * 5/2020 Wechselberger ....... B25C 1/047
2020/0338708 A1 10/2020 Po
2021/0008701 A1 1/2021 Tan et al.
2021/0101272 A1 4/2021 Saitou et al.
2021/0138622 A1 5/2021 Enta et al.
2021/0205969 A1 7/2021 Zhu
2021/0299837 A1 * 9/2021 Garces ...................... B25C 1/06
2021/0308852 A1 10/2021 Ueda et al.
2021/0347023 A1 * 11/2021 Carrier ...................... B25C 1/06
2022/0126433 A1 * 4/2022 Leimbach ................. B25C 5/13
2022/0143798 A1 5/2022 Cholst et al.
2022/0241948 A1 * 8/2022 Baba ....................... B25C 1/047
2022/0339767 A1 10/2022 Zhu
2022/0355451 A1 11/2022 Mecklenburg et al.
2022/0371169 A1 11/2022 Kuriki et al.
2022/0388135 A1 * 12/2022 Neuhoff .................. B25C 1/041
2023/0090859 A1 3/2023 Yasutomi et al.
2023/0125450 A1 4/2023 Kuriki et al.
2023/0126083 A1 4/2023 Baba et al.
2023/0191574 A1 * 6/2023 Ward ...................... B25C 1/047 227/130
2023/0191575 A1 * 6/2023 Bierdeman ............. B25C 1/047 173/1
2023/0202011 A1 * 6/2023 Bierdeman ............. B25C 1/047 227/140
2023/0278177 A1 * 9/2023 Julius ...................... B25C 1/047 227/129
2023/0311285 A1 * 10/2023 Rux ........................ B25C 1/047 227/8
2024/0051103 A1 2/2024 Kuriki et al.

FOREIGN PATENT DOCUMENTS

CN 201111458 Y 9/2008
CN 101288962 A 10/2008
CN 102689289 A 9/2012
CN 202702169 U 1/2013
CN 105818099 A 8/2016
CN 205835215 U 12/2016
CN 106654801 A 5/2017
CN 206154233 U 5/2017
CN 107249823 A 10/2017
CN 107708934 A 2/2018
CN 107803790 A 3/2018
CN 107914242 A 4/2018
CN 207206347 U 4/2018
CN 108068059 A 5/2018
DE 8711784 U1 11/1987
EP 3263286 A1 1/2018
EP 3308907 A1 4/2018
JP 2016221610 A 12/2016
JP 2018034258 A 3/2018
WO WO2016046188 A1 3/2016
WO WO2016160699 A1 10/2016
WO WO2016190133 A1 12/2016
WO WO2016199670 A1 12/2016
WO WO2017056810 A1 4/2017
WO WO2021102894 A1 6/2021
WO WO 2023/146894 * 8/2023 ............... B25C 1/06

* cited by examiner

GAS SPRING-POWERED FASTENER DRIVER

CROSS-REFERENCE TO RELATED APPLICATIONS

This application claims priority to U.S. Provisional Patent Application No. 63/718,005, filed on Nov. 8, 2024, and U.S. Provisional Patent Application No. 63/620,242, filed on Jan. 12, 2024, the entire contents of both of which are incorporated herein by reference.

FIELD OF THE DISCLOSURE

The present disclosure relates to powered fastener drivers, and more specifically to gas spring-powered fastener drivers.

BACKGROUND OF THE DISCLOSURE

There are various fastener drivers known in the art for driving fasteners (e.g., nails, tacks, staples, etc.) into a workpiece. These fastener drivers operate utilizing various means known in the art (e.g., compressed air generated by an air compressor, electrical energy, a flywheel mechanism, etc.) to drive a driver blade from a top-dead-center position toward a bottom-dead-center position to strike a fastener and drive the fastener into a workpiece.

SUMMARY OF THE DISCLOSURE

The present disclosure provides, in one aspect, a powered fastener driver including: a driver blade movable from a top-dead-center position to a bottom-dead-center position for driving a fastener into a workpiece; and a lifting assembly for providing torque to move the driver blade from the bottom-dead-center position toward the top-dead-center position, the lifting assembly including a rotary lifter configured to be selectively engageable with the driver blade, the rotary lifter having a plurality of lift pins and a roller disposed on at least one of the lift pins, and a motor configured to provide torque to the rotary lifter; wherein the roller includes a plurality of cam portions defined by cup-shaped recesses having a first radius oriented parallel to a rotational direction of the roller and a second radius perpendicular to the first radius, and wherein the driver blade includes a lift tooth having a crown disposed thereon, the crown configured to be engaged with at least one of the plurality of cam portions.

In some aspects, the techniques described herein relate to a powered fastener driver including: a pressure vessel in which a pressurized gas is maintained; a piston movable within the pressure vessel from a top-dead-center (TDC) position to a bottom-dead-center (BDC) position by the pressurized gas; a driver blade coupled for movement with the piston from the TDC position to the BDC position for driving a fastener into a workpiece; a lifting assembly configured to selectively engage the driver blade to move the driver blade from the BDC position toward the TDC position; a housing in which the pressure vessel and the lifting assembly are disposed, a first damper positioned between the pressure vessel and the housing; and a second damper positioned between the pressure vessel and the housing; wherein the first damper and the second damper are positioned asymmetric relative to one another about a plane containing an axis along which the driver blade is movable; and wherein the first damper and the second damper are configured to dampen movement of the pressure vessel relative to the housing.

In some aspects, the techniques described herein relate to a powered fastener driver including: a pressure vessel in which a pressurized gas is maintained; a piston movable within the pressure vessel from a top-dead-center (TDC) position to a bottom-dead-center (BDC) position by the pressurized gas; a driver blade coupled for movement with the piston from the TDC position to the BDC position for driving a fastener into a workpiece; a lifting assembly operable to move the driver blade from the BDC position toward the TDC position, the lifting assembly including a motor positioned with a motor case and a gear train positioned within a gear case, the motor being oriented along a motor axis; and a plurality of gear case bolts connecting the gear case and the motor case, the gear case bolts arranged in a gear case bolt pattern having an irregular quadrilateral shape as viewed perpendicular to the motor axis; wherein the quadrilateral shape includes at least one obtuse included angle measured between two adjacent gear case bolts and the motor axis greater than 90 degrees and at least one acute included angle less than 90 degrees.

In some aspects, the techniques described herein relate to a powered fastener driver system including: a powered fastener driver including a pressure vessel in which a pressurized gas is maintained; a piston movable within the pressure vessel from a top-dead-center (TDC) position to a bottom-dead-center (BDC) position by the pressurized gas; a driver blade coupled for movement with the piston from the TDC position to the BDC position for driving a fastener into a workpiece; and a fill port in fluid communication with the pressure vessel through which pressurized gas is transferred into the pressure vessel, the fill port including a first connector; a first fill adapter including a first adapter attachable with the first connector of the fill port to supply pressurized gas from an external fluid supply to the pressure vessel; and a second fill adapter including a second adapter different from the first adapter and incompatible with the first connector of the fill port, thereby preventing the second fill adapter from supplying pressurized gas from the external fluid supply to the pressure vessel.

In some aspects, the techniques described herein relate to a powered fastener driver including: a housing including an intake region with an airflow inlet, an exhaust region with an airflow outlet, a cylinder portion, and a motor housing portion; a pressure vessel in which a pressurized gas is maintained; a piston movable within the pressure vessel from a top-dead-center (TDC) position to a bottom-dead-center (BDC) position by the pressurized gas; a driver blade coupled for movement with the piston from the TDC position to the BDC position for driving a fastener into a workpiece; a motor positioned within the motor housing portion and configured to provide torque to move the driver blade from the BDC position toward the TDC position; a fan coupled to the motor, the fan configured to generate a cooling airflow from the airflow inlet to the airflow outlet upon activation of motor; and a divider positioned within the housing between the motor and the motor housing portion to separate the intake region from the exhaust region and inhibit passage of the cooling airflow exhausted from the fan in the exhaust region from reentering the intake region.

In some aspects, the techniques described herein relate to a powered fastener driver including: a driver blade movable along a driver blade axis from a top-dead-center (TDC) position toward a bottom-dead-center position (BDC) for driving a fastener into a workpiece; a gas spring mechanism for driving the driver blade toward the BDC position; a rotary lifter for returning the driver blade from the BDC position toward the TDC position, the rotary lifter including at least one flange and plurality of lift pins extending from the flange, the rotary lifter being movable to an axial home position relative to the driver blade axis whereby the driver blade can engage the lift pins; a motor; a drive shaft extending along a drive shaft axis non-intersecting with the driver blade axis, the drive shaft coupled to and configured to receive torque from the motor, the drive shaft coupled to and configured to transmit torque to the rotary lifter to return the driver blade from the BDC position toward the TDC position, the drive shaft including a shoulder; and a spring positioned between the shoulder and the flange along the drive shaft axis, the spring configured to apply an axial biasing force along the drive shaft axis to the rotary lifter.

In some aspects, the techniques described herein relate to a powered fastener driver including a driver blade movable from a top-dead-center position to a bottom-dead-center position for driving a fastener into a workpiece; and a lifting assembly for providing torque to move the driver blade from the bottom-dead-center position toward the top-dead-center position, the lifting assembly including a rotary lifter configured to be selectively engageable with the driver blade, the rotary lifter having a plurality of lift pins and a roller disposed on at least one of the lift pins, and a motor configured to provide torque to the rotary lifter; wherein the driver blade includes a lift tooth having a crown disposed thereon, the crown being engaged with the roller during movement of the driver blade toward the top-dead-center position.

In some aspects, the techniques described herein relate to a powered fastener driver including a driver blade movable from a top-dead-center position to a bottom-dead-center position for driving a fastener into a workpiece; and a lifting assembly for providing torque to move the driver blade from the bottom-dead-center position toward the top-dead-center position, the lifting assembly including a rotary lifter configured to be selectively engageable with the driver blade, the rotary lifter having a plurality of lift pins, and a motor configured to provide torque to the rotary lifter; wherein at least one of the plurality of lift pins includes a plurality of cam portions defined by cup-shaped recesses having a first radius oriented parallel to a rotational direction of the roller and a second radius perpendicular to the first radius, and wherein the driver blade includes a lift tooth having a crown disposed thereon, the crown configured to be engaged with at least one of the plurality of cam portions during movement of the driver blade toward the top-dead-center position.

Other features and aspects of the disclosure will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
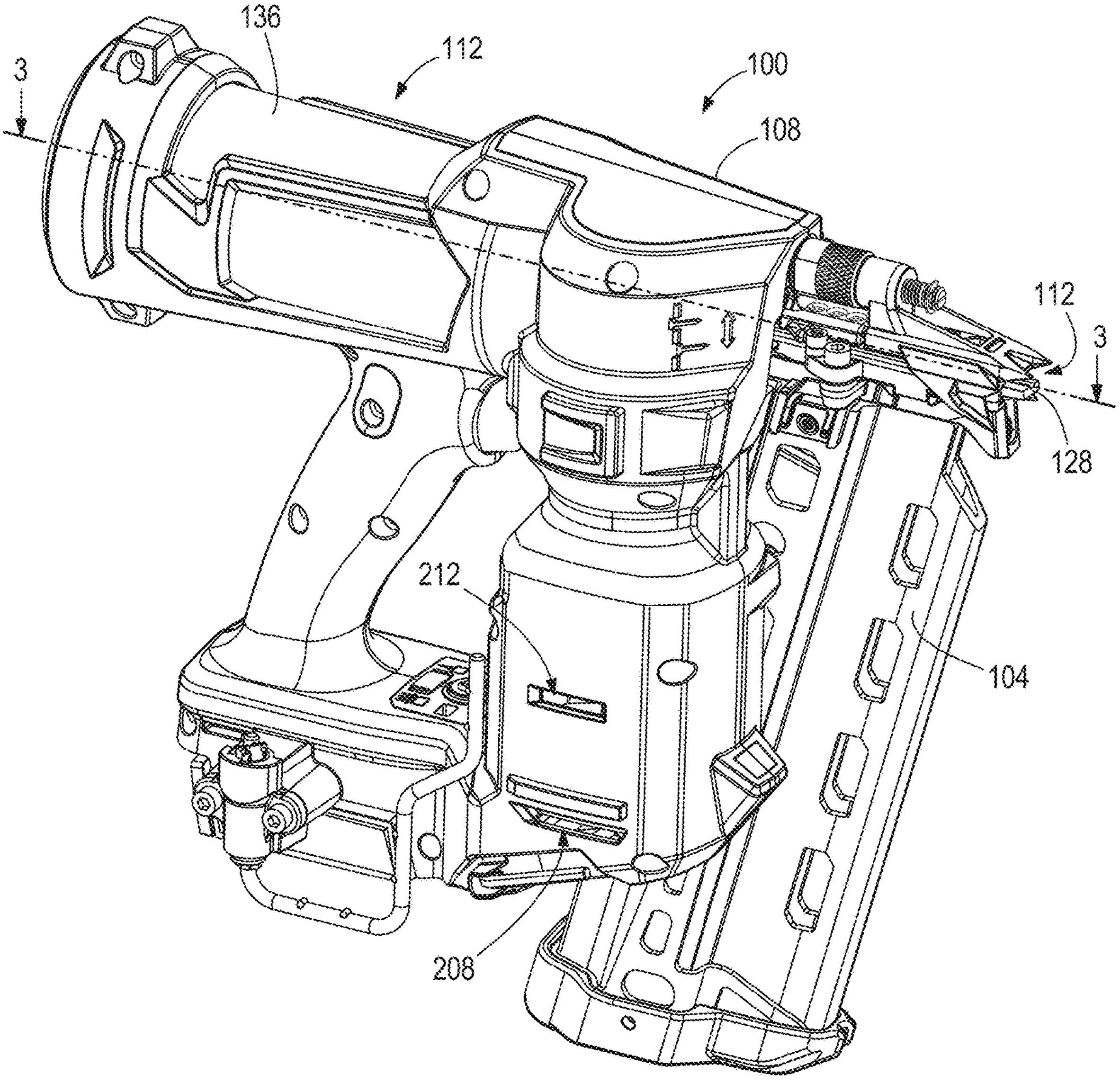
FIG. 1 is perspective view of a powered fastener driver in accordance with an embodiment of the present disclosure.
Figure 2:
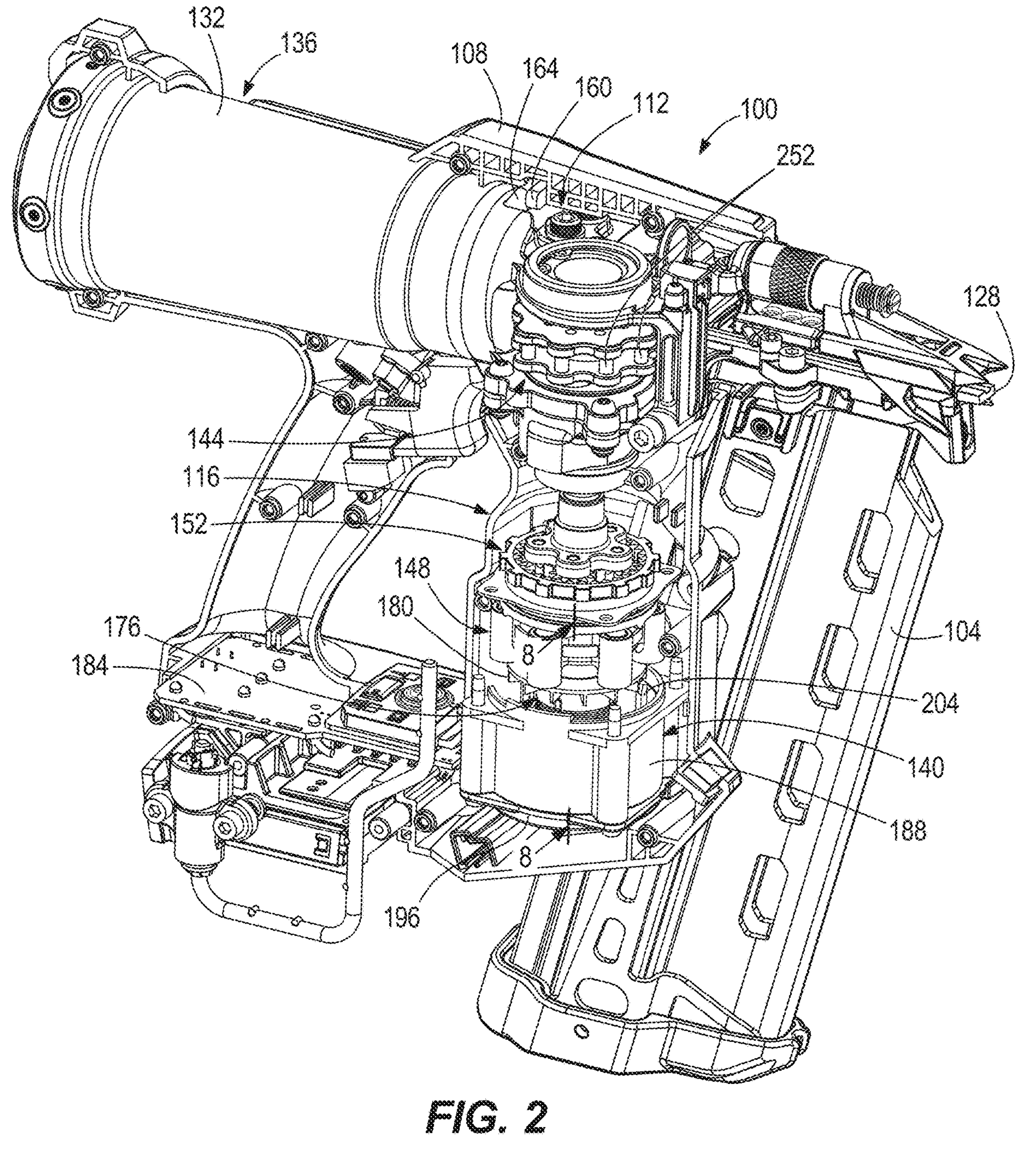
FIG. 2 is a perspective view of the powered fastener driver of FIG. 1, with a portion of a housing hidden.
Figure 3:
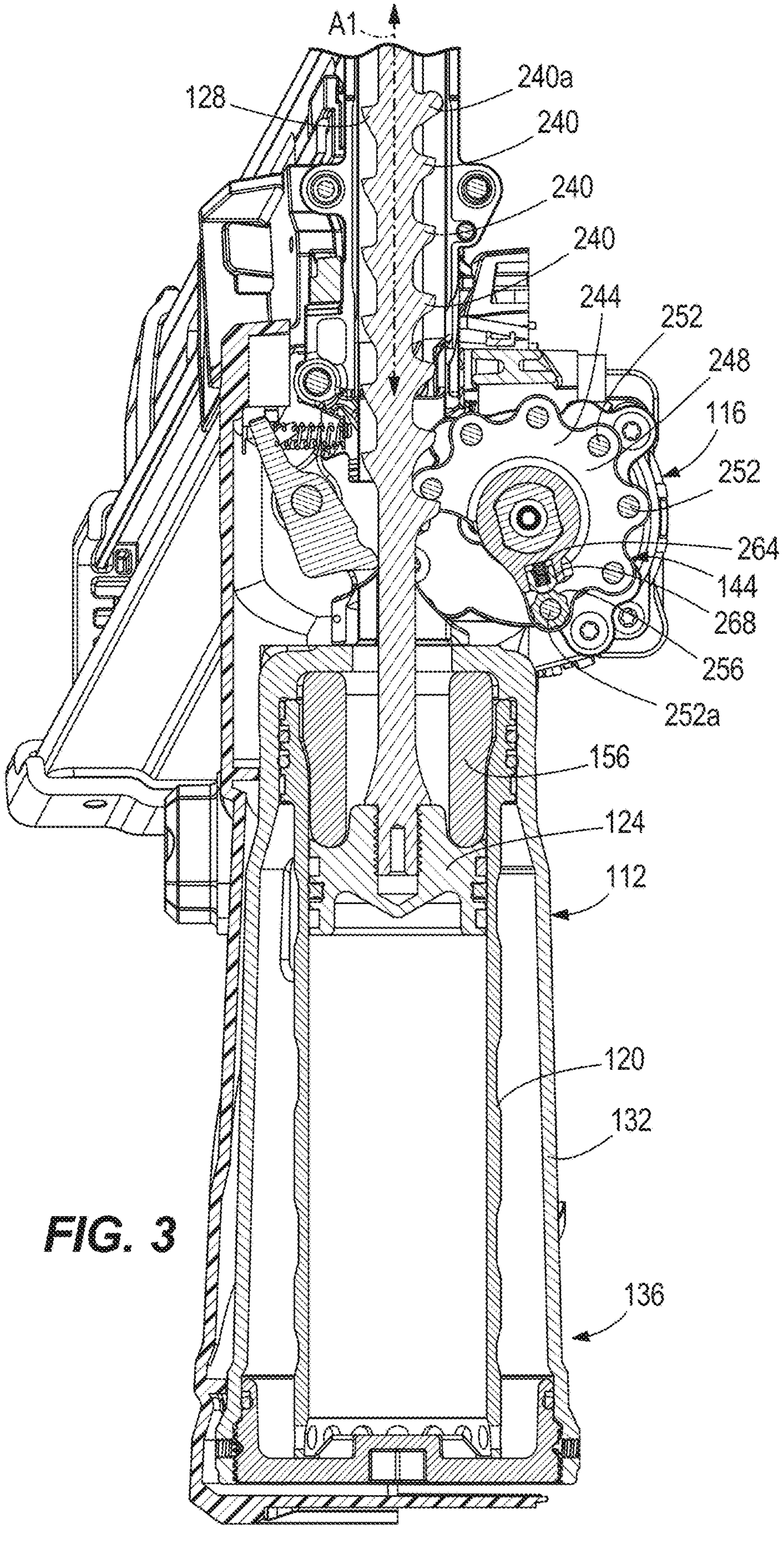
FIG. 3 is a cross-sectional view of the powered fastener driver, taken along section line 3-3 in FIG. 2.

FIGS. 1-3 illustrate a gas spring-powered fastener driver 100 in accordance with the present disclosure. The fastener driver 100 is operable to drive fasteners (e.g., nails, tacks, staples, etc.) that are held within a magazine 104 into a workpiece (not shown). The fastener driver 100 includes a housing 108, illustrated as a two-piece clamshell housing, supporting a driving assembly 112 operable to drive a fastener and a lifting assembly 116 operable to reset the driving assembly 112, such that the fastener driver 100 can drive another fastener. The driving assembly 112 includes an inner cylinder 120 and a movable piston 124 positioned within the inner cylinder 120. The piston 124 is movable within the inner cylinder 120 between a ready or top-dead-center (TDC) position (not shown) and a driven or bottom-dead-center position (BDC; FIG. 3). A driver blade 128 is coupled to the piston 124 and movable therewith along a driving axis (i.e., driver blade axis) A1. The fastener driver 100 does not require an external source of air pressure to drive a fastener, but rather includes a storage chamber cylinder or outer cylinder 132 of pressurized gas in fluid communication with the inner cylinder 120. In the illustrated embodiment, the outer cylinder 132 encompasses the inner cylinder 120, and together the outer cylinder 132 and the inner cylinder 120 form a compression chamber (i.e., storage chamber) 136. As the driver blade 128 and the piston 124 move toward the ready position, the air within the compression chamber 136 (e.g., above the piston 124) is compressed, thereby increasing an amount of pressure acting on the piston 124. The lifting assembly 116 includes a motor 140 operably coupled to a rotary lifter 144. The rotary lifter 144 is selectively engageable with the driver blade 128, as will be discussed in further detail herein, to move the driver blade 128 and the piston 124 to the ready position. In the illustrated embodiment, a one-way clutch 148 and a transmission 152, such as a planetary transmission, are disposed between the motor 140 and the rotary lifter 144.

In operation, the lifting assembly 116 provides torque generated by the electric motor 140 via the one-way clutch 148 and the transmission 152 to the rotary lifter 144. Rotation of the rotary lifter 144 moves the driver blade 128 from the driven position toward the ready position. Movement of the driver blade 128 and the piston 124 to the ready position compresses the gas contained within the compression chamber 136. Thus, the lifting assembly 116 provides torque to the rotary lifter 144 to move the driver blade 128 to the ready position, thereby increasing an amount of pressure acting on the piston 124. To driver a fastener, the driver blade 128 is released from the ready position and moves toward the driven position due to the pressure of the gas acting on the piston 124. The compression chamber 136 is a sealed environment and therefore acts as a gas spring on the piston 124. As the driver blade 128 moves toward the BDC position, the driver blade 128 contacts the fastener to drive the fastener into the workpiece. Further details regarding certain structures of the fastener driver 100 are given below.

Referring to FIGS. 2-6, the compression chamber 136 is coupled to the housing 108 and capable of limited movement relative to the housing 108. During a fastener driver operation, the piston 124 contacts a bumper 156 (FIG. 3) when reaching the driven position. The bumper 156 aids in dispersing excess energy not used to drive the fastener. The bumper 156, however, is supported by the outer cylinder 132 of the compression chamber 136 and contact between the piston 124 and the bumper 156 can also cause movement of the compression chamber 136. To prevent damage to the housing 108 due to movement of the compression chamber 136, a plurality of compliant members or dampers 160 (e.g., two, three, more than three) are disposed between the compression chamber 136 and the housing 108. The dampers 160 are formed of a vibration damping material. The dampers 160 may be compliant in that they deflect upon an application of force. The dampers 160 may include rubber material. The dampers 160 are disposed between the housing 108 and the compression chamber 136 to allow the compression chamber 136 to move relative to the housing 108 while supporting the compression chamber 136 relative to the housing 108.

Figure 4:
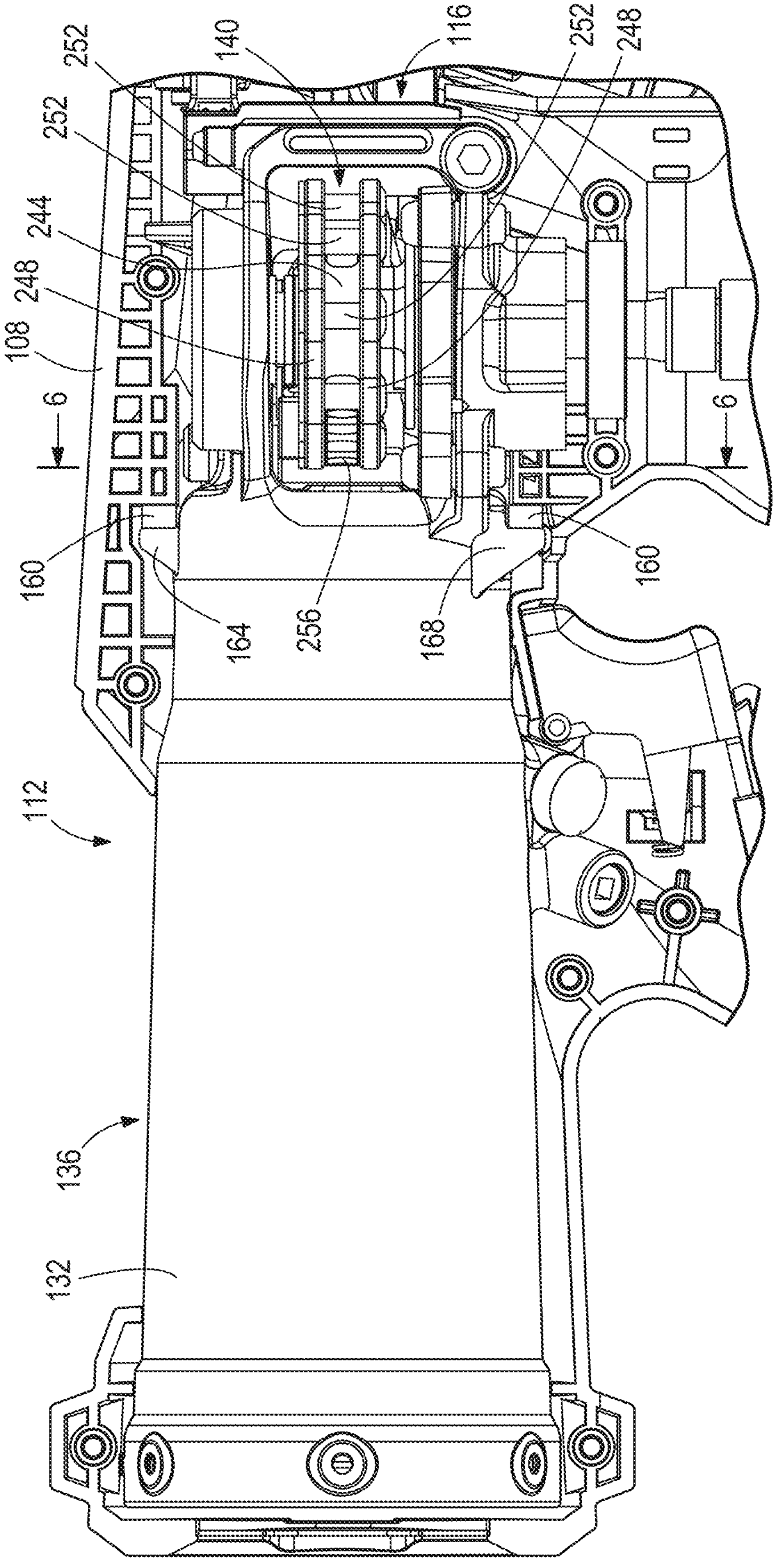
FIG. 4 is a partial side view of the powered fastener driver of FIG. 1, illustrating a compression chamber.
Figure 5:
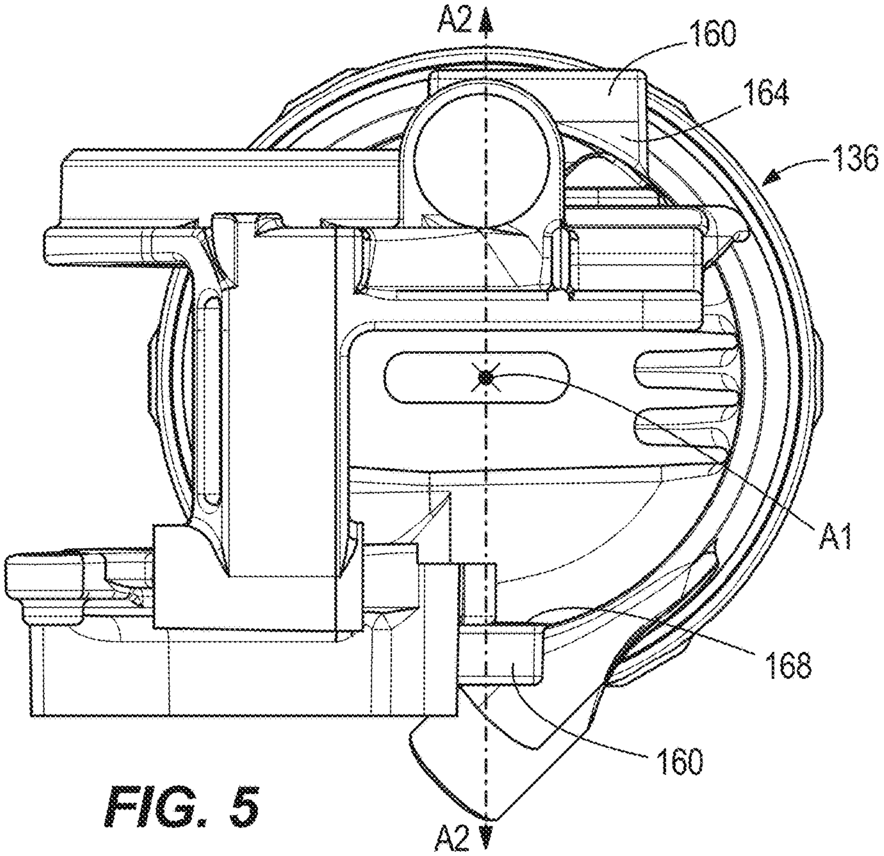
FIG. 5 is a bottom view of the compression chamber.
Figure 6:
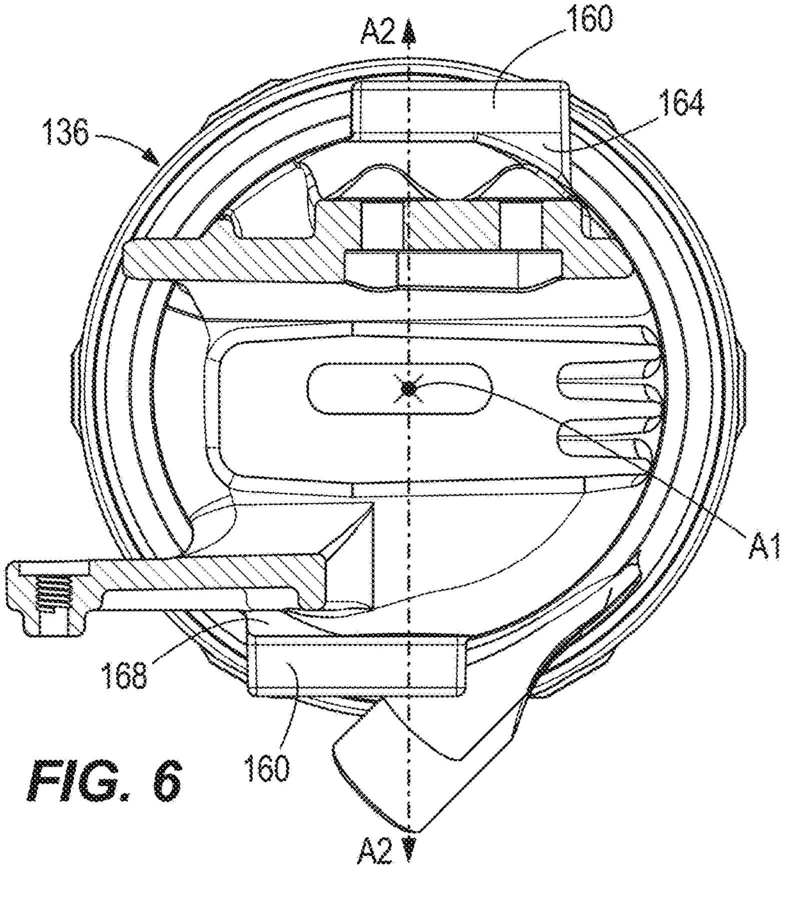
FIG. 6 is a cross-sectional view of the compression chamber of FIG. 3, taken along section line 6-6 in FIG. 4.
Figure 7:
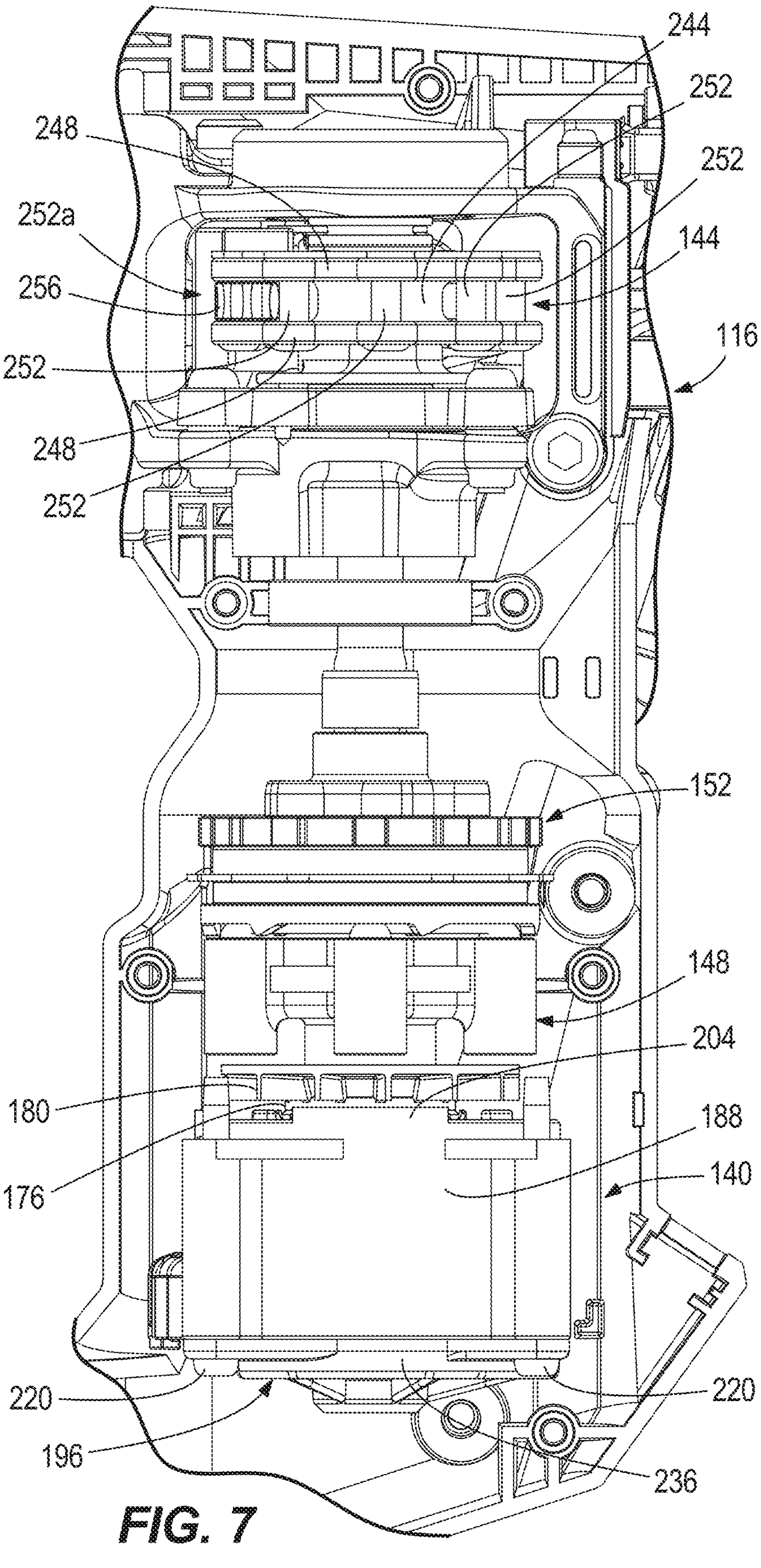
FIG. 7 is a partial side view of the powered fastener driver of FIG. 2, illustrating a lifting assembly.
Figure 8:
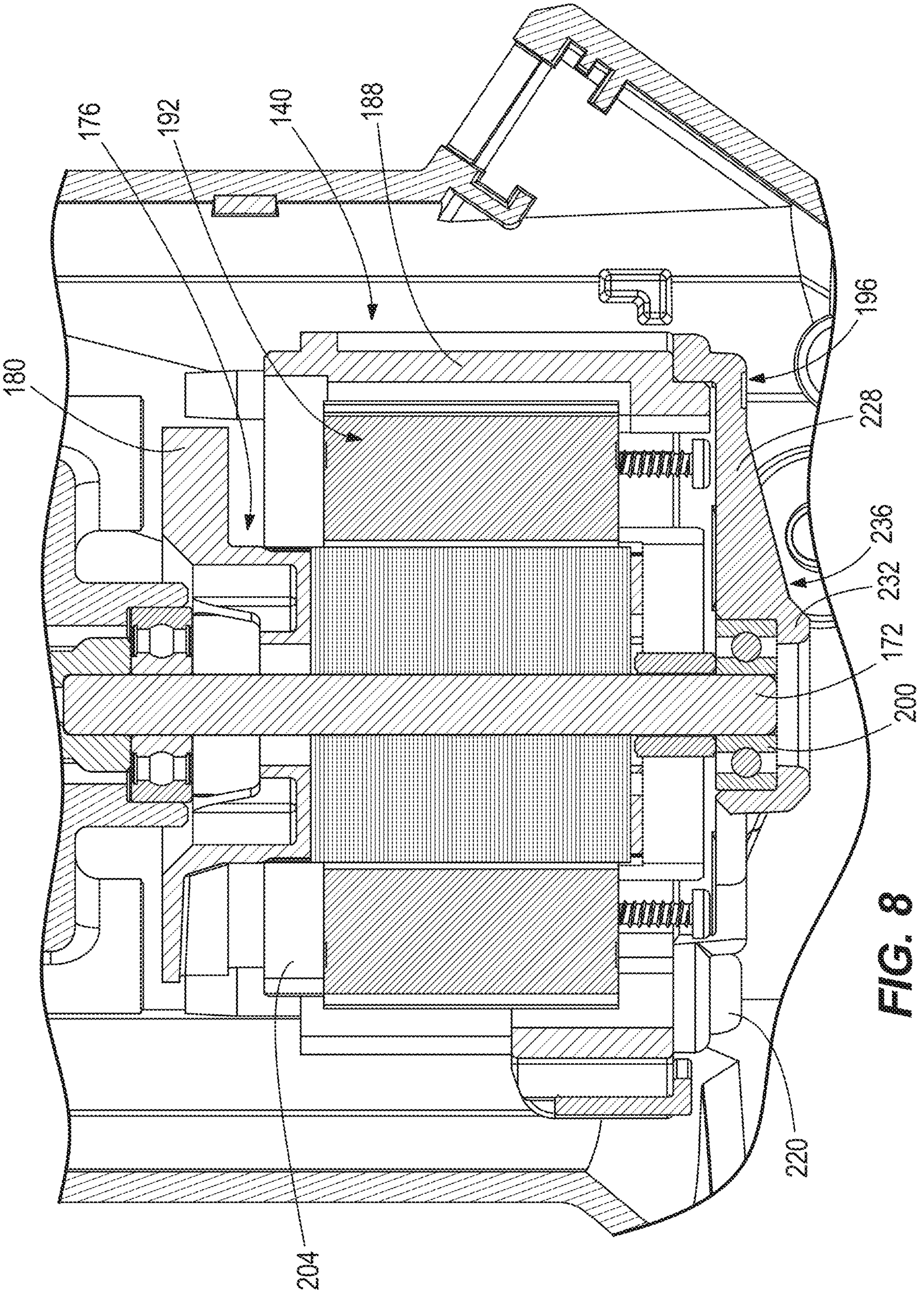
FIG. 8 is a partial cross-sectional view of the powered fastener driver of FIG. 2, taken along section line 8-8 in FIG. 2.

With continued reference to FIGS. 4-6, the compression chamber 136 includes a first flange 164 extending from the outer cylinder 132 and a second flange 168 extending from the outer cylinder 132 opposite the first flange 164. The first flange 164 is positioned on a first side of the driving axis A1, and the second flange 168 is positioned on a second side of the driving axis A1. The first and second flanges 164, 168 are not symmetric about a plane containing the driving axis A1. Rather, the first and second flanges 164, 168 are offset relative to a central vertical axis A2 (FIGS. 5 and 6). The first flange 164 is generally rectangular in shape when viewed along the driving axis A1. The second flange 168 is also generally rectangular in shape when viewed along the driving axis A1. A length dimension of each of the first and the second flanges 164, 168 is measured tangentially to the outer cylinder 132. The first flange 164 is offset from the central vertical axis A2 in a direction parallel to the length dimension, such that the central vertical axis A2 does not bisect the first flange 164. Similarly, the second flange 168 is offset from the central vertical axis A2 in a direction parallel to the length dimension, such that the central vertical axis A2 does not bisect the second flange 168. In the illustrated embodiment, the first flange 164 is offset in a first direction and the second flange 168 is offset in a second direction, opposite the first direction. The first and second flanges 164, 168 of the illustrated embodiment are offset an equal magnitude. However, in other embodiments, the first and second flanges 164, 168 may be offset different magnitudes. Furthermore, in the illustrated embodiment, each of the first flange 164 and the second flange 168 are offset an amount equal to less than half their length. Thus, an overlapping region is formed in which portions of each of the first flange 164 and the second flange 168 are vertically aligned. In other embodiments, the flanges 164, 168 may be offset an amount greater than half of their respective lengths such that no overlapping region exists. The first and the second flanges 164, 168 are offset to utilize space within the housing 108, thus allowing for generally rectangular flanges 164, 168, and dampers 160, while minimizing an overall size of the housing 108. However, it should be understood that neither the first flange 164 nor the second flange 168 needs to be generally rectangular. The dampers 160 are positioned asymmetric relative to one another about a plane (e.g., A2-A2) containing an axis A1 along which the driver blade 128 is movable.

In the illustrated embodiment, each of the first and second flanges 164, 168 supports one of the pair of dampers 160. Each of the pair of dampers 160 corresponds in shape to the shape of the respective flange 164, 168 to which it is coupled. Thus, each of the pair of dampers 160 is generally rectangular in shape when viewed along the driving axis A1. In other embodiments, the dampers 160 may have a different cross-sectional shape depending on the shape of their associated flange 164, 168 and the space within the housing 108. For example, a damper 160 may have a generally straight inner surface and a curved outer surface, or a damper 160 may change height along the length of the damper 160 forming a non-standard cross-sectional shape.

Figure 18:
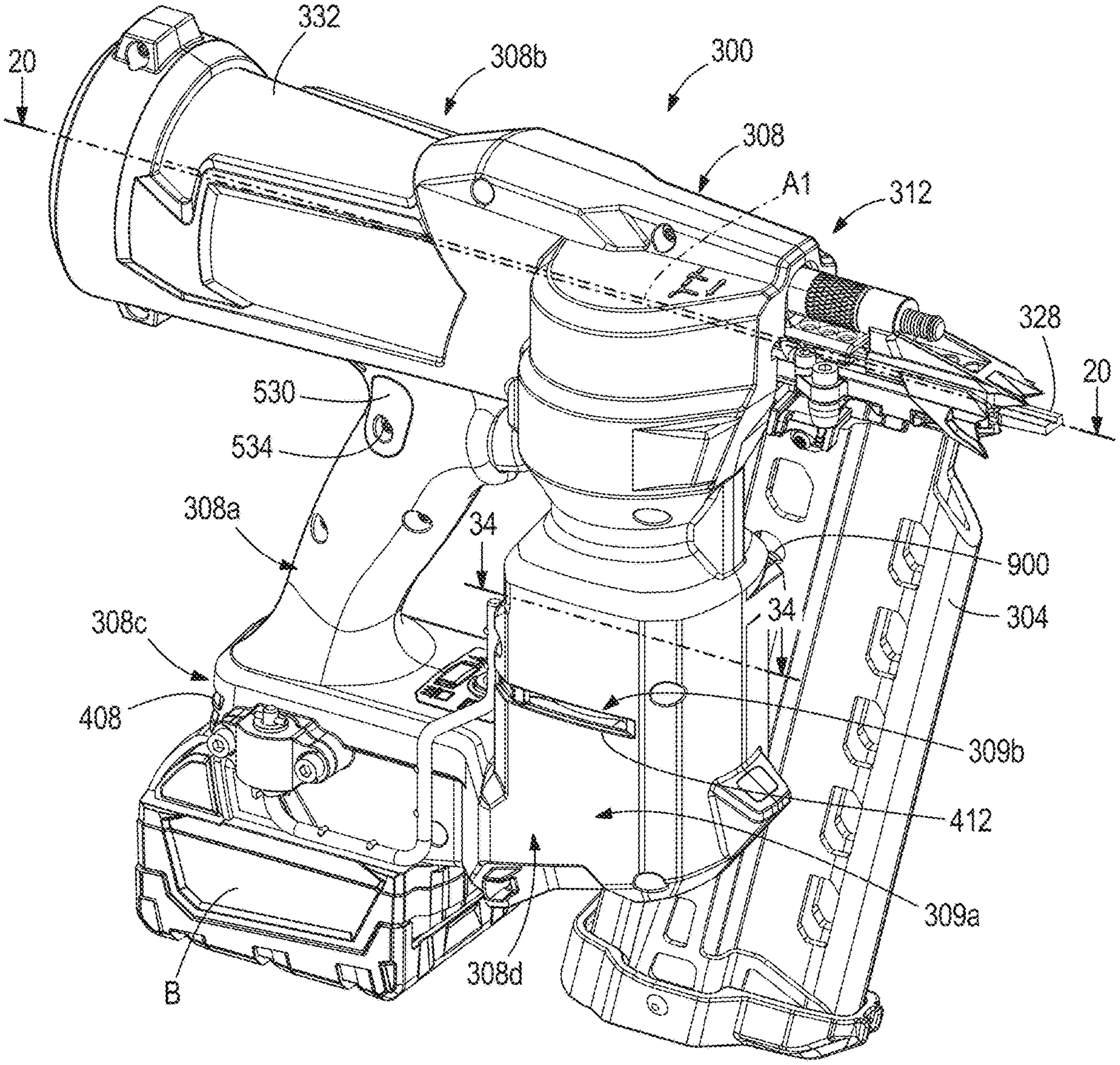
FIG. 18 is a perspective view of a powered fastener driver in accordance with another embodiment of the present disclosure.
Figure 19:
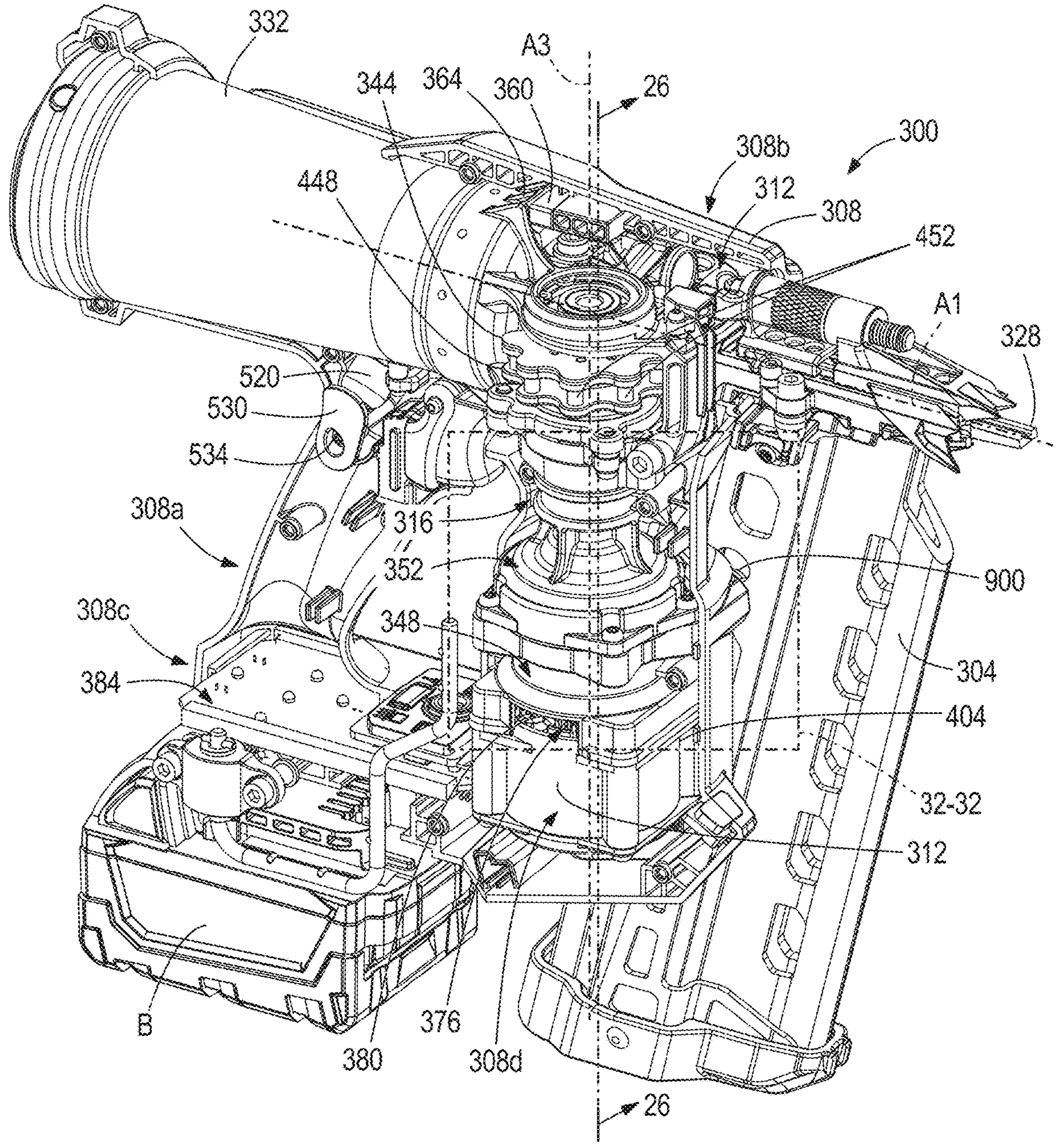
FIG. 19 is a perspective view of the powered fastener driver of FIG. 18, with a portion of a housing hidden.
Figure 20:
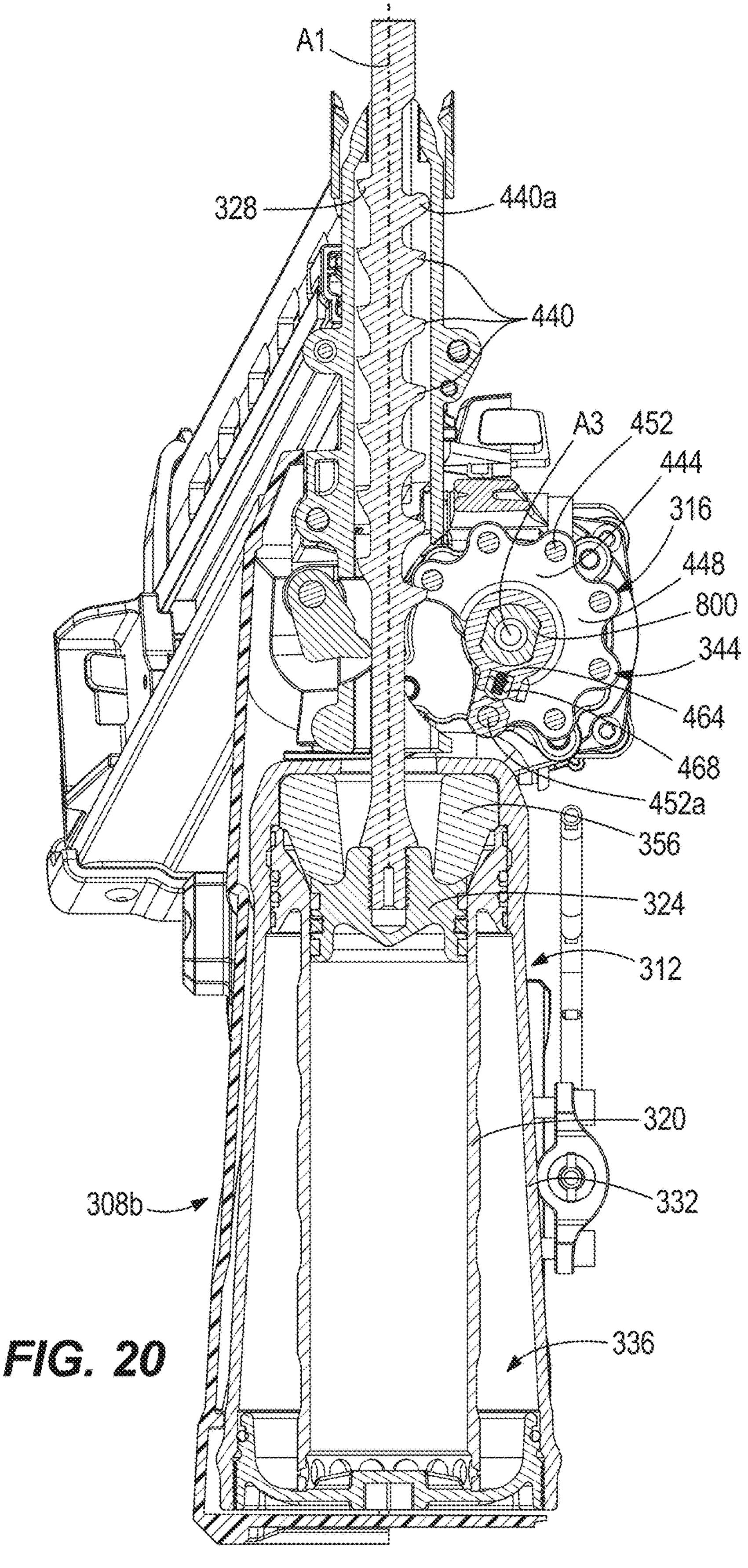
FIG. 20 is a cross-sectional view of the powered fastener driver, taken along section line 20-20 in FIG. 19.
Figure 21:
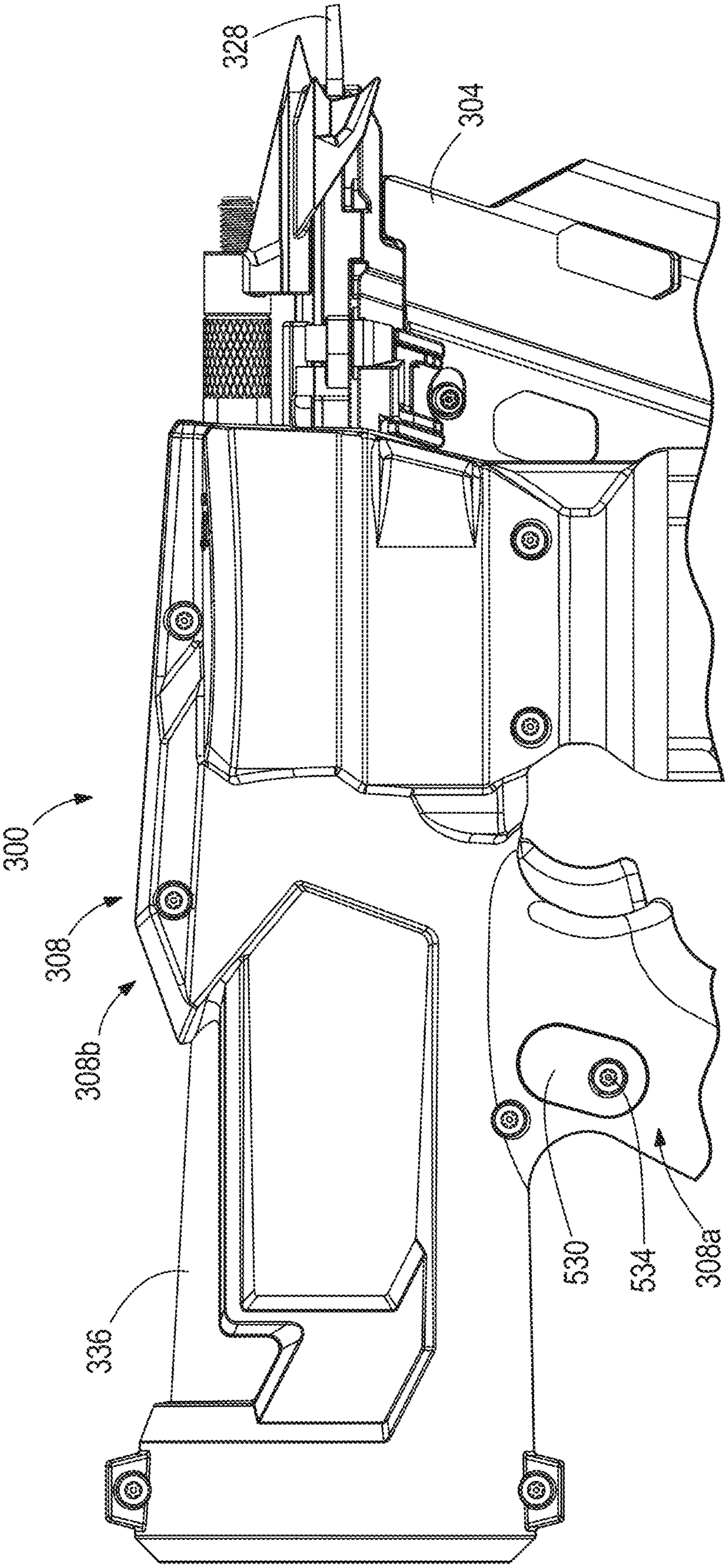
FIG. 21 is a partial side view of the powered fastener driver of FIG. 18.
Figure 22:
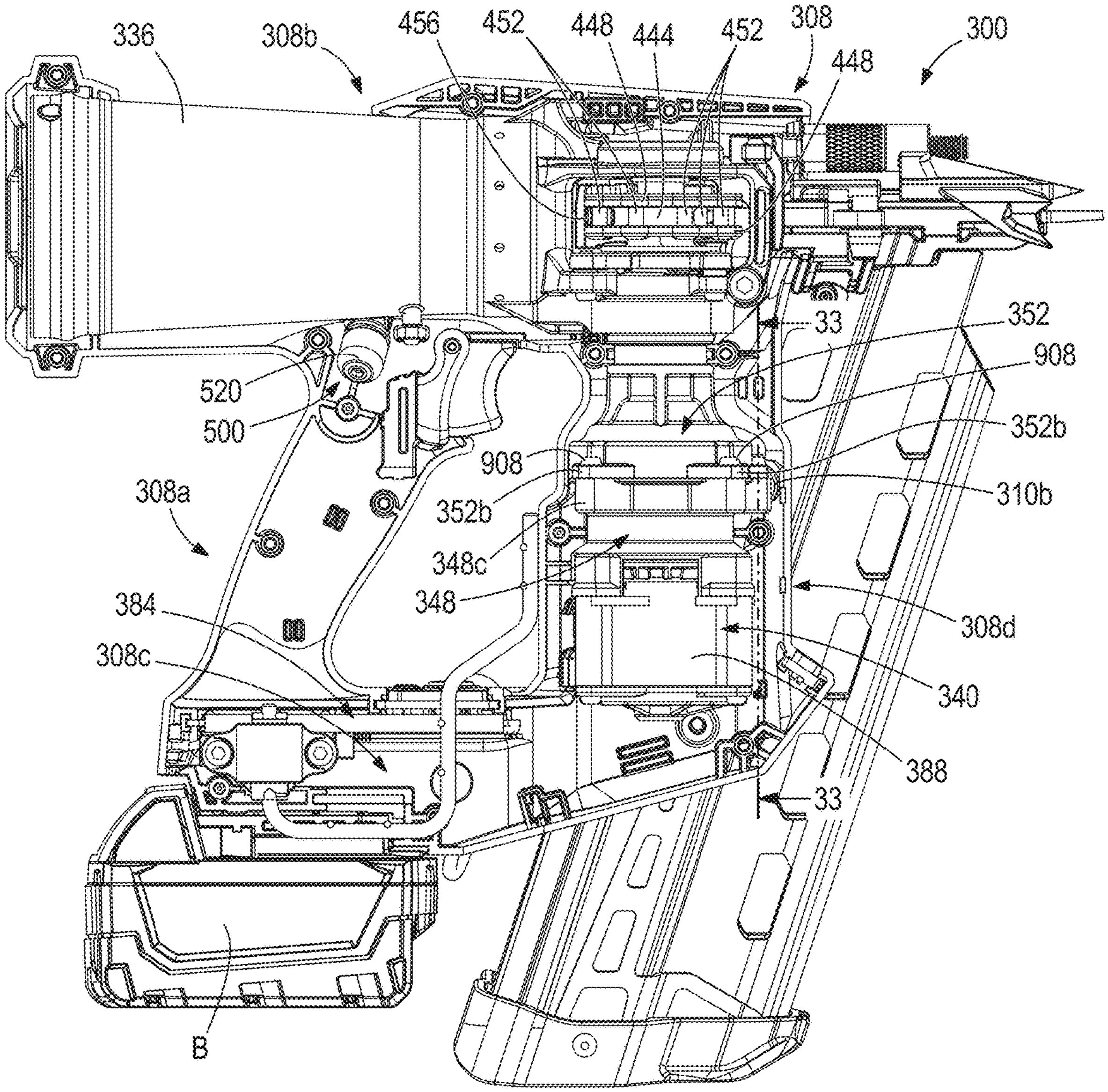
FIG. 22 is a side view of the powered fastener driver of FIG. 18, with a portion of a housing hidden to illustrate a compression chamber.

FIGS. 2 and 7-10 illustrate further details of the lifting assembly 116 and in particular the motor 140 of the lifting assembly 116. As previously mentioned, the lifting assembly 116 includes the motor 140 which is operatively coupled to the rotary lifter 144 via the one-way clutch 148 and a planetary transmission 152. The motor 140 is an internal rotor brushless DC electric motor that receives power from a battery pack (B, FIG. 18). The motor 140 includes an output shaft 172 coupled to an internal rotor 176 and to the clutch 148 to transmit torque generated by the electric motor 140 to the transmission 152 via the clutch 148. A fan 180 is coupled to the internal rotor 176 for co-rotation therewith. In the illustrated embodiment, the fan 180 is integrally formed with the internal rotor 176 and disposed adjacent to the clutch 148. The fan 180 draws air through the motor 140 due to rotation of the internal rotor 176 and thus aids in cooling the motor 140. The air is also directed over other components of the fastener driver 100, such as a controller 184 (FIG. 2). The motor 140 further includes a housing 188 in which an outer stator 192 is disposed. A shroud 196 is coupled to the housing 188 to aid in directing airflow through the motor 140. The output shaft 172 of the motor 140 extends beyond the housing 188 of the motor 140. The output shaft 172 is supported for rotation at one end by a bearing 200 coupled to the shroud 196 and is coupled to the internal rotor 176 at the other. The fan 180 is disposed outside of the housing 188 of the motor 140 opposite the shroud 196. In the illustrated embodiment, the housing 188 of the motor 140 includes a baffle 204 having a constant diameter. The baffle 204 is disposed adjacent to the fan 180 to aid in directing airflow generated by the fan 180. The housing 108 of the fastener driver 100 includes at least one inlet 208 adjacent to the shroud 196 and at least one outlet 212 adjacent to the fan 180 (FIG. 2). In some embodiments, the housing 108 of the fastener driver 100 may further include an inlet (not shown) disposed adjacent to the controller 184. The inlet 208 and the outlet 212 accommodate airflow generated by the fan 180.

Figure 9:
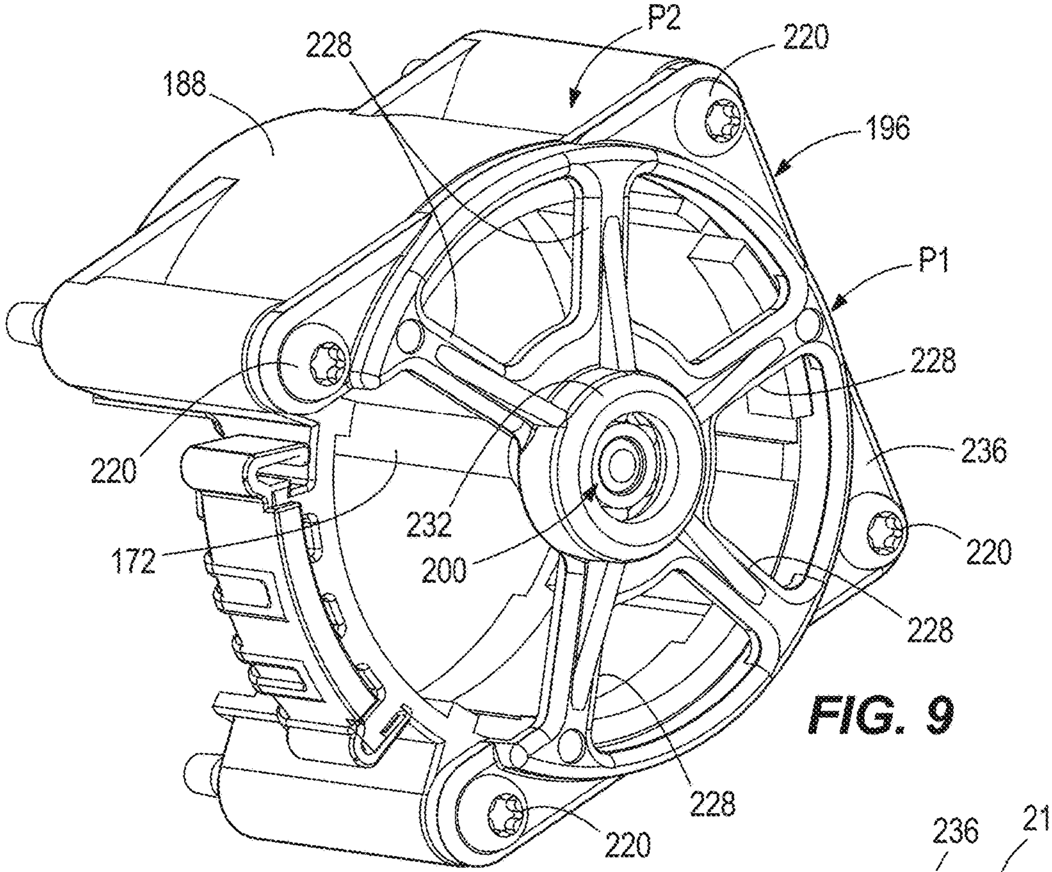
FIG. 9 is a partial perspective view of a motor of the lifting assembly.
Figure 10:
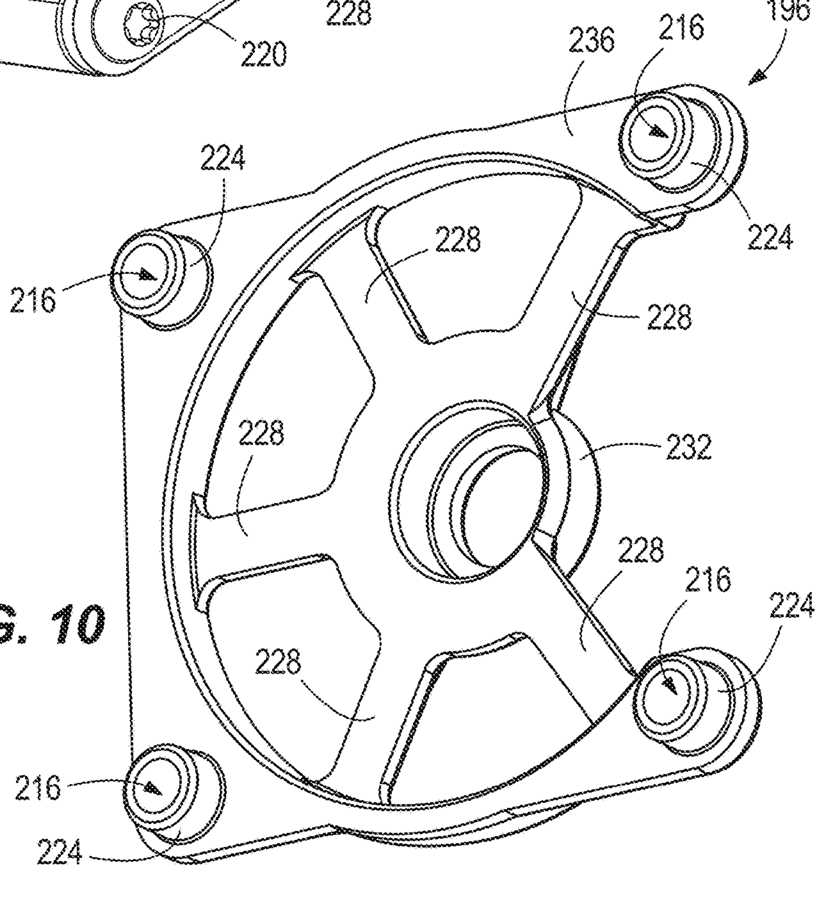
FIG. 10 is a rear perspective view of a shroud of the motor.
Figure 11:
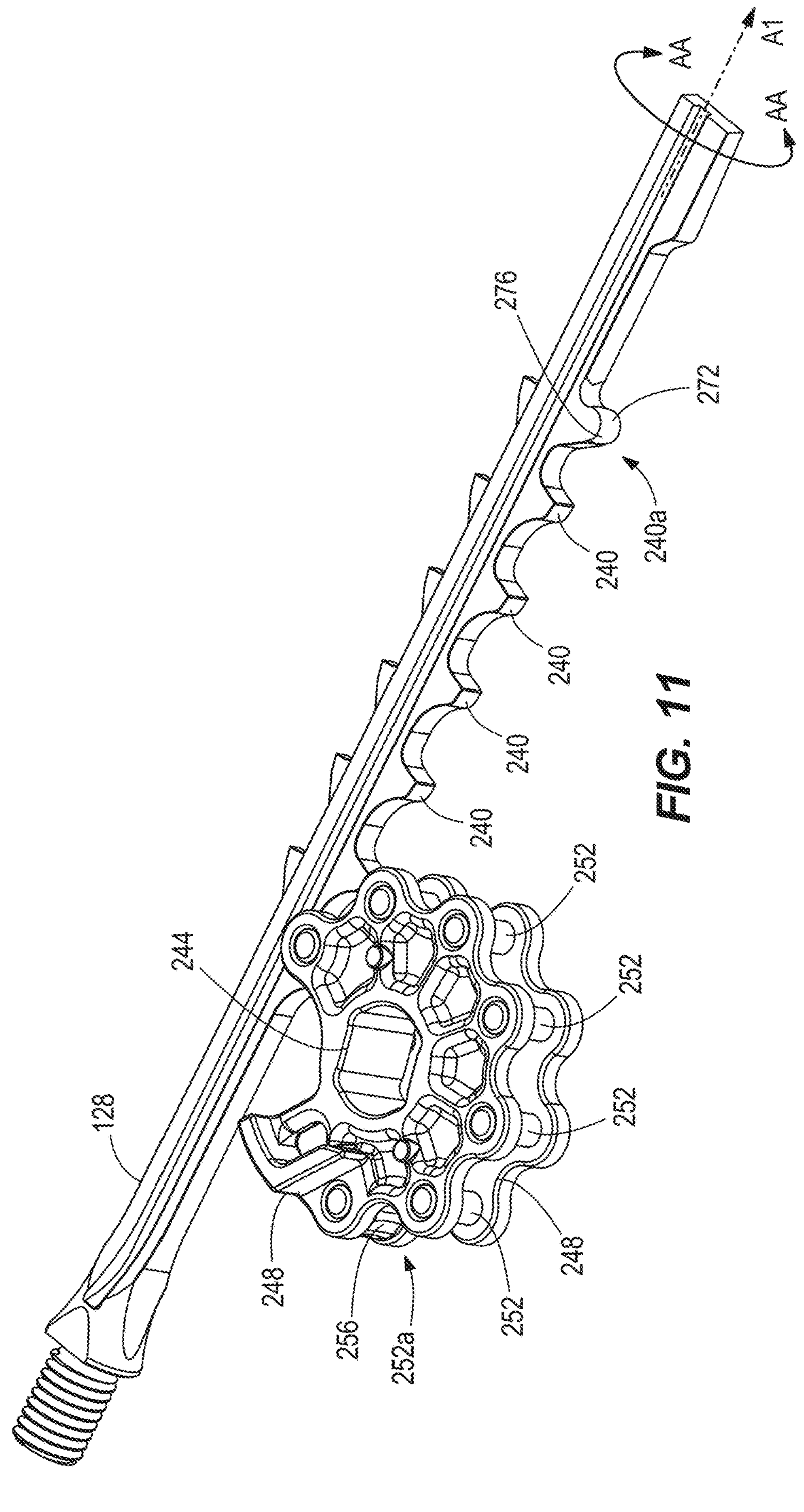
FIG. 11 is a perspective view of a rotary lifter and a driver blade of the powered fastener driver.

With reference to FIGS. 9 and 10, the shroud 196 is shaped such that an outer periphery P1 of the shroud 196 correlates to an outer periphery P2 of the housing 188 of the motor 140. However, the outer periphery P1 of the shroud 196 includes only three sides, rather than four sides to match the outer periphery P2 of the housing 188. The shroud 196 includes a plurality of apertures 216 through which a plurality of fasteners 220 extend to couple the shroud 196 to the housing 188. In the illustrated embodiment, the each of the plurality of apertures 216 are positioned within a cylindrical protrusion 224. The cylindrical protrusions 224 aid in aligning the shroud 196 with the housing 188 of the motor 140. The shroud 196 further includes a plurality of radially inwardly extending arms 228 that support a centrally located bearing mount 232. The bearing 200 and the output shaft 172 are supported within the bearing mount 232. In the illustrated embodiment, the shroud 196 includes five arms 228. However, in other embodiments, a shroud 196 may include more or fewer arms 228. A body 236 of the shroud 196 is shaped to direct airflow into the motor 140. Thus, in the illustrated embodiment, the body 236 is generally cylindrical and aligns with the stator 192 of the motor 140. In other embodiments, the body 236 of the shroud 196 may have a different shape corresponding to a desired airflow. For example, a shroud 196 may not include a central bearing support, and an output shaft may be supported by another component of a motor. The shroud 196 may also have any number of arms or zero arms. In some embodiments, the shroud 196 may be disposed adjacent to the fan 180, rather than opposite the fan 180 as illustrated.

FIGS. 2, 3, and 11-17 illustrate further details of the lifting assembly 116 and in particular the rotary lifter 144 of the lifting assembly 116. As previously mentioned, the rotary lifter 144 is selectively engaged with the driver blade 128 to move the driver blade 128 along the driving axis A1 from the driven position to the ready position. The driver blade 128 includes a plurality of lift teeth 240 extending laterally therefrom. The rotary lifter 144 is coupled to the transmission 152 to receive torque from the motor 140 and includes a body 244 having a pair of opposed plates (i.e., flanges) 248 between which a plurality of lift pins 252 are disposed. In the illustrated embodiment, the rotary lifter 144 includes seven lift pins 252. As the rotary lifter 144 rotates, each of the lift pins 252 sequentially engages a lift tooth 240 of the driver blade 128 to move the driver blade 128 from the driven position to the ready position.

Figure 12:
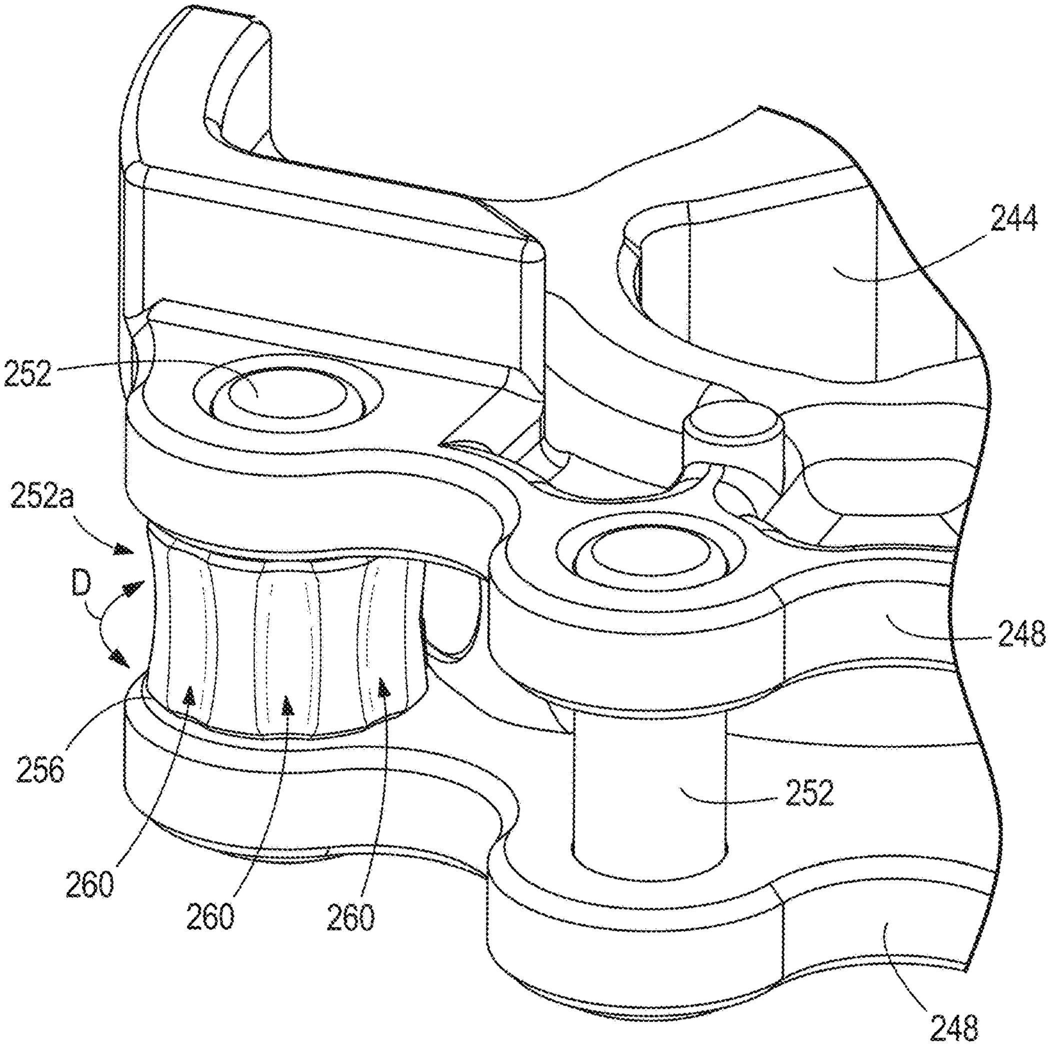
FIG. 12 is a perspective view of a portion of the rotary lifter, illustrating a last pin of the rotary lifter.
Figure 13:
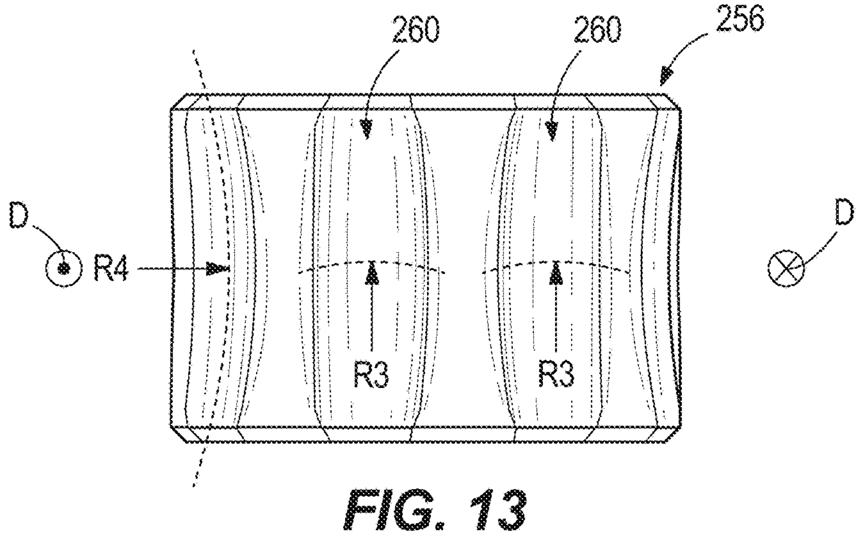
FIG. 13 is a side view of the last pin of the rotary lifter.

With reference to FIGS. 12 and 13, a last pin **252*a* of the plurality of lift pins 252 is shaped differently than the remainder of the plurality of lift pins 252. The last pin 252*a* engages with a last tooth 240*a* of the lift teeth 240 when the driver blade 128 is at or near the ready position (i.e., TDC). Unlike the remainder of the plurality of lift pins 252, a roller 256 (i.e., blade engagement member) is disposed on the last pin 252*a*. The roller 256 is rotatable about the last pin 252*a* in a direction D. The roller 256 is shaped to engage with the last lift tooth 240*a* of the driver blade 128. In some embodiments, the roller 256 may be integrally formed with the last pin 252*a*, rather than supported by the last pin 252*a* as shown. The roller 256 includes a plurality of cup-shaped recesses or cam portions 260 that are engageable with the last lift tooth 240*a*. In other embodiments, rather than being formed in the roller 256, the cup-shaped recesses or cam portions 260 may be formed in one or more of the plurality of lift pins 252 themselves. The recesses or cam portions 260 may be directly defined in the last pin 252*a*, and the roller 256 may be omitted. The recesses or cam portions 260 may be generally concave in shape. In the illustrated embodiment, the roller 256 includes eight cam portions 260. However, in other embodiments, the roller 256 may include more or fewer cam portions 260. A detent mechanism, illustrated as a spring 264 and abutment plug 268 (FIG. 3), is supported by the body 244 of the rotary lifter 144 and engages with the cam portions 260 of the roller 256 to prevent free rotation of the roller 256. During operation, the last tooth 240*a* of the driver blade 128 is engaged with the roller 256 as the driver blade 128 approaches the ready position. The ability of the roller 256 to rotate about the last pin 252*a* prevents excess stress and wear on the last pin 252*a* that may be caused due to sliding of the last tooth 240*a* of the driver blade 128 relative to the last pin 252*a*, and the shape of the cam portions 260 corresponds with a shape of the last tooth 240*a*** of the driver blade 128 aid with alignment of the last tooth 240*a* of the driver blade 128 and the roller 256.

Figure 14:
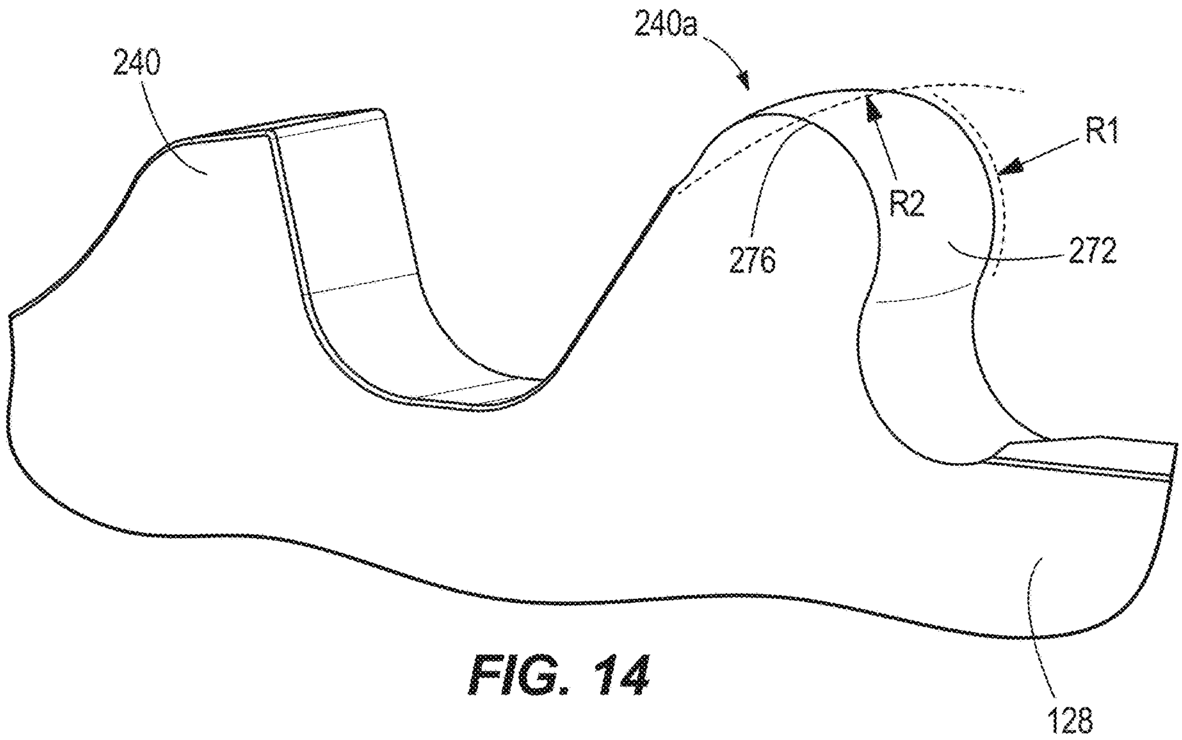
FIG. 14 is a partial perspective view of the driver blade, illustrating a last tooth of the driver blade.
Figure 15:
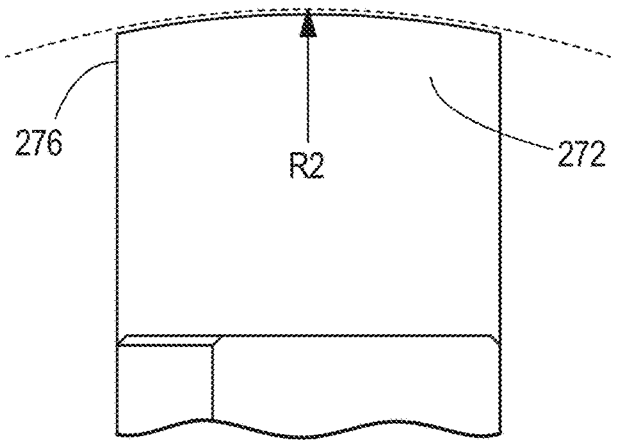
FIG. 15 is a partial bottom view of the last tooth of the driver blade.

FIGS. 14 and 15 illustrate the last tooth 240*a* of the driver blade 128 in further detail. The last tooth 240*a* of the driver blade 128 is positioned farthest from the piston 124 (FIG. 3) and is engaged with the rotary lifter 144 when the driver blade 128 is at or near the ready position. The last tooth 240*a* of the driver blade 128 has a first radius R1 in a direction parallel to the driving axis A1. The first radius R1 defines a shape of the last tooth 240*a* to engage with the roller 256. More particularly, the first radius R1 is shaped to engage with the cam portions 260 of the roller 256. The last tooth 240*a* of the driver blade 128 further includes a crown 272 to decrease potential wear on the tooth 240*a* and on the rotary lifter 144. In some instances, the driver blade 128 may rotate or twist about the driving axis A1 in the direction of arrow AA during operation. The crown 272 is formed as a second radius R2 or crown radius in a direction perpendicular to the driving axis A1 and concentric with the arrow AA. The second radius R2 is shaped to allow the last tooth 240*a* to rotate about the driving axis A1 relative to the rotary lifter 144. Thus, the driver blade 128 is able to twist about the driving axis A1 relative to the rotary lifter 144 without causing undue wear on the rotary lifter 144.

With reference again to FIGS. 12 and 13, the cam portions 260 of the roller 256 are shaped to engage with the crown 272 of the last tooth 240*a*. More particularly, each cam portion 260 of the illustrated embodiment is radiused in two directions. A first cam portion radius R3 is applied tangentially to the rotational direction of the roller 256 to create the cup-shaped recess that engages with the last lift tooth 240*a*. A second cam portion radius R4 is applied perpendicular to the first cam portion radius R3. The second cam portion radius R4 corresponds to the second radius R2 of the last tooth 240*a* and provides clearance for the driver blade 128 to rotate about the driving axis A1 about arrow AA relative to the roller 256, while limiting excess wear on the roller 256 and/or the last tooth 240*a* of the driver blade 128 due to the rotation about the driving axis A1.

Figure 16:
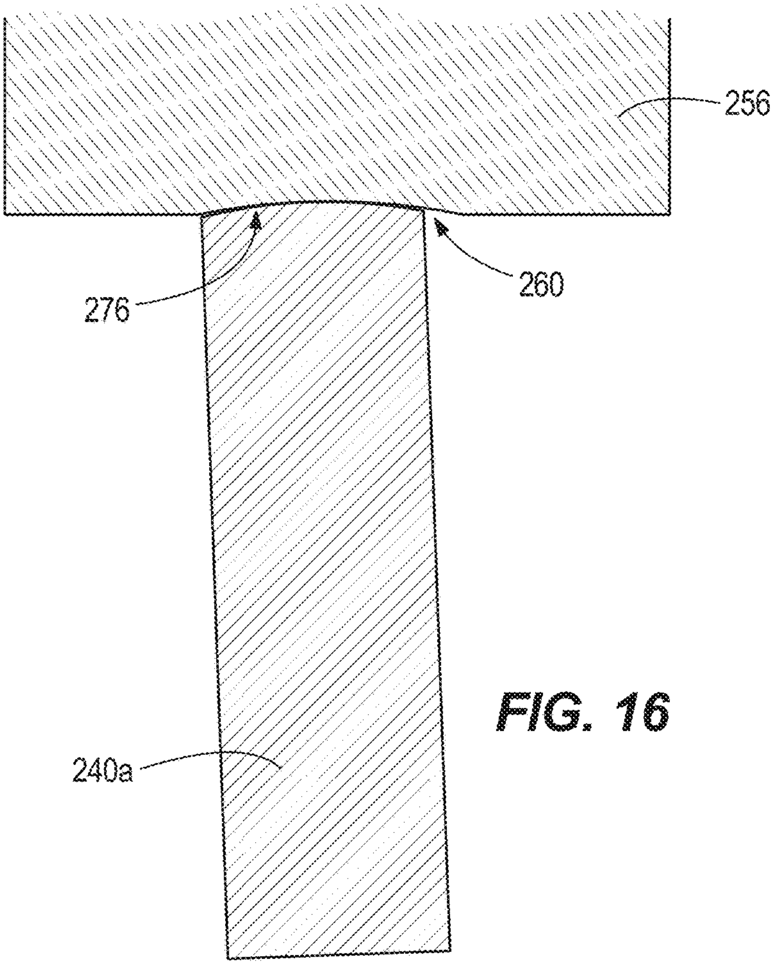
FIG. 16 is a schematic illustrating engagement between the last tooth of the driver blade and the last pin of the rotary lifter.
Figure 17:
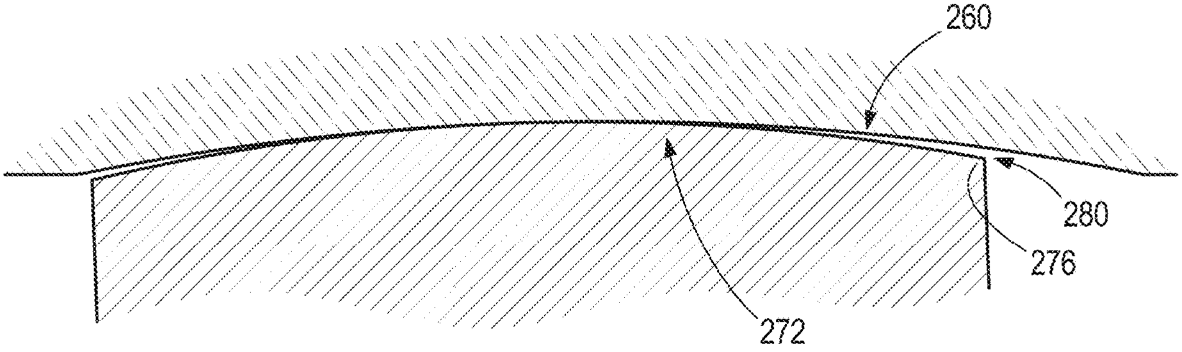
FIG. 17 is a detail view of a portion of the schematic of FIG. 16.

FIGS. 16 and 17 schematically illustrate the last tooth 240*a* of the driver blade 128 and a cam portion 260 of the roller 256. In the illustrated embodiment, the second radius R2 that defines the crown 272 of the last tooth 240*a* is smaller than the second cam portion radius R4. Thus, the driver blade 128 can rotate about the driving axis A1 relative to the roller 256 while maintaining contact between the crown 272 and the cam portion 260. Maintaining contact with the crown 272 prevents contact between an edge 276 of the last tooth 240*a* and the roller 256, which could cause premature wear of the last tooth 240*a* and/or the roller 256. In the illustrated embodiment, the second cam portion radius R4 of the roller 256 is 20% larger than the second radius R2 that defines the crown 272 of the last tooth 240*a*. Thus, as illustrated in FIG. 16, the last tooth 240*a* of the driver blade 128 may rotate two degrees while maintaining contact between the crown 272 and the cam portion 260. FIG. 17 is a detail view of FIG. 16 illustrating an area of contact between the crown 272 and the cam portion 260. As illustrated in FIG. 17, a gap 280 exists between the edge 276 of the last tooth 240*a* and the cam portion 260. Without the difference in radii, the two-degree rotation could result in contact between the edge 276 and the roller 256. In other embodiments, the difference in size of the radii may be between 1% and 60%, depending on the desired amount of relative rotation about the driving axis that is allowed between the driver blade and the roller. In each embodiment, the radius of the cam portion of the roller is larger than the radius of the crown of the last tooth.

FIGS. 18-24 and 26-35 illustrate another gas spring-powered fastener driver 300. The gas spring-powered fastener driver 300 includes features like the gas spring-powered fastener driver 100 with reference numerals incremented by '200'. The gas spring-powered fastener driver 300 operates in a similar manner to the gas spring-powered fastener driver 100 as described above.

With reference to FIGS. 18, 19, and 20-24, the gas spring-powered fastener driver 300 includes a fill port 500 in fluid communication with storage chamber 336 (i.e., pressure vessel) (as defined by, for example, the volume within both the inner cylinder 320 rearward of the piston 324 and within the outer cylinder 332) through which pressurized gas is transferred into the storage chamber 336. The storage chamber 336 is in fluid communication with the cylinder (e.g., the inner cylinder 320 and the outer cylinder 332) in which a pressurized gas is maintained for exerting pressure on the piston 324. The storage chamber 336 may be defined similarly to the compression chamber (i.e., storage chamber 136) of the gas spring-powered fastener driver 100. Pressurized gas may be transferred from an external fluid supply FS to conduct a first pressurization of the storage chamber 336 during assembly of the gas spring-powered fastener driver 300. The same fill port 500 may transfer gas from the external fluid supply FS into the storage chamber 336 to repressurize (i.e., refill) the storage chamber 336 after incidental leakage of the storage chamber 336 during use of the gas spring-powered fastener driver 300.

Figure 23:
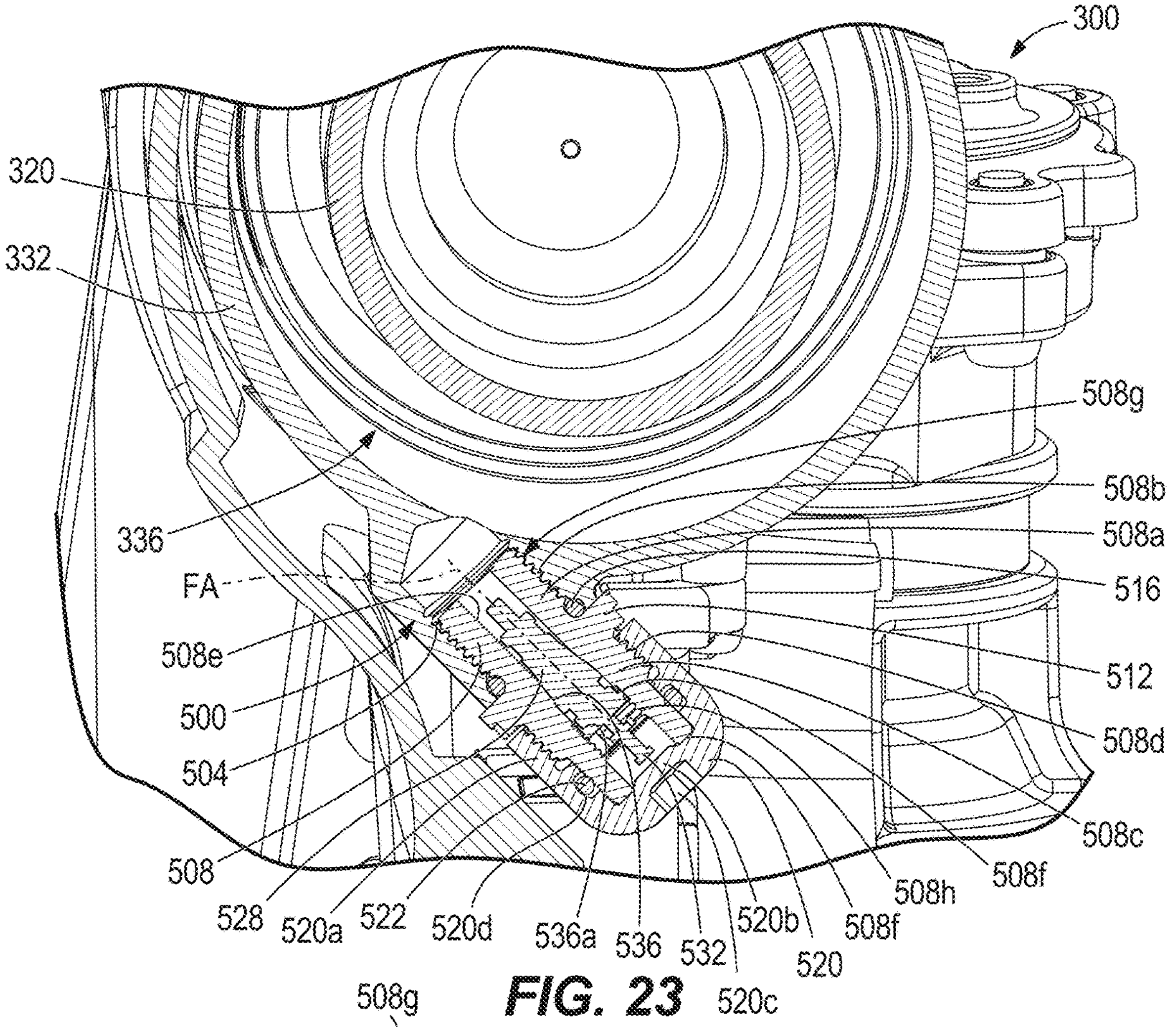
FIG. 23 is a cross-sectional view of the powered fastener driver, taken along section line 23-23 in FIG. 22 and with a fitting and a plug engaging a fill port.

In the embodiment of FIG. 23, the fill port 500 includes threads 504 that are engageable by a connector 508. The connector 508 is coupled to the storage chamber 336. The connector 508 includes a tool-side 508*a* with tool-side threads 508*b* configured to be secured to the threads 504 and an opposite outer-side 508*c* with outer-side threads 508*d*. The tool-side 508*a* and outer-side 508*c* are separated by a shoulder 512. An o-ring 516 is positioned adjacent the shoulder 512 to assist in sealing the connector 508 to the compression chamber 336. The tool-side threads 508*b* are attachable with the threads 504 to secure the connector 508 to the fill port 500. The connector 508 further defines a bore 508*e*, an outboard axial end surface 508*f*, and a radial outer surface 508*g* on which the tool-side threads 508*b* and the outer-side threads 508*d* are located. The bore 508*e* in the illustrated embodiment varies in diameter along a length of the connector 508 along a filling axis FA. The illustrated bore 508*e* includes a smaller size on the tool-side 508*a* and a larger size on the outer-side 508*c*, with a transition in size axially along the filling axis FA near the shoulder 512. The bore 508*e* may include interior threads 508*h*.

The outer-side threads 508*d* of the connector 508 are selectively engageable by a plug 520 and a adapter 524 (i.e., a first adapter 524). In the embodiment of FIG. 23, the plug 520 is secured to the connector 508. The plug 520 is generally dome-shaped. The plug 520 includes internal threads 520*a* attachable to the outer-side threads 508*d*. The internal threads 520*a* of the plug 520 are positioned on an inner surface of the plug 520 that face radially inwardly toward the filling axis FA. The plug 520 further includes an end wall 520*b* that inhibits access to the interior of the connector 508 when the plug 520 is attached to the connector 508. The end wall 520*b* includes a non-circular recess 520*c* engageable by a tool (not shown) to selectively attach the plug 520 to the connector 508. In the illustrated embodiment, the recess 520*c* is a hexagonal receptacle in which a hexagonal tool (e.g., an Allen key) is received. The plug 520 further includes an o-ring receptacle 520*d* (i.e., seal receptacle) that receives a plug o-ring 522 to further assist sealing the plug 520 with the connector 508. When fully attached to the connector 508, the end wall 520*b* of the plug 520 abuts the axial end surface 508*f* of the connector 508.

In other embodiments, the features of the connector 508 may be integrally formed with the compression chamber 336. In such embodiments, the threads 508*d* capable of engaging the plug 520 or the adapter 524 may be integral with the compression chamber 336.

Figure 24:
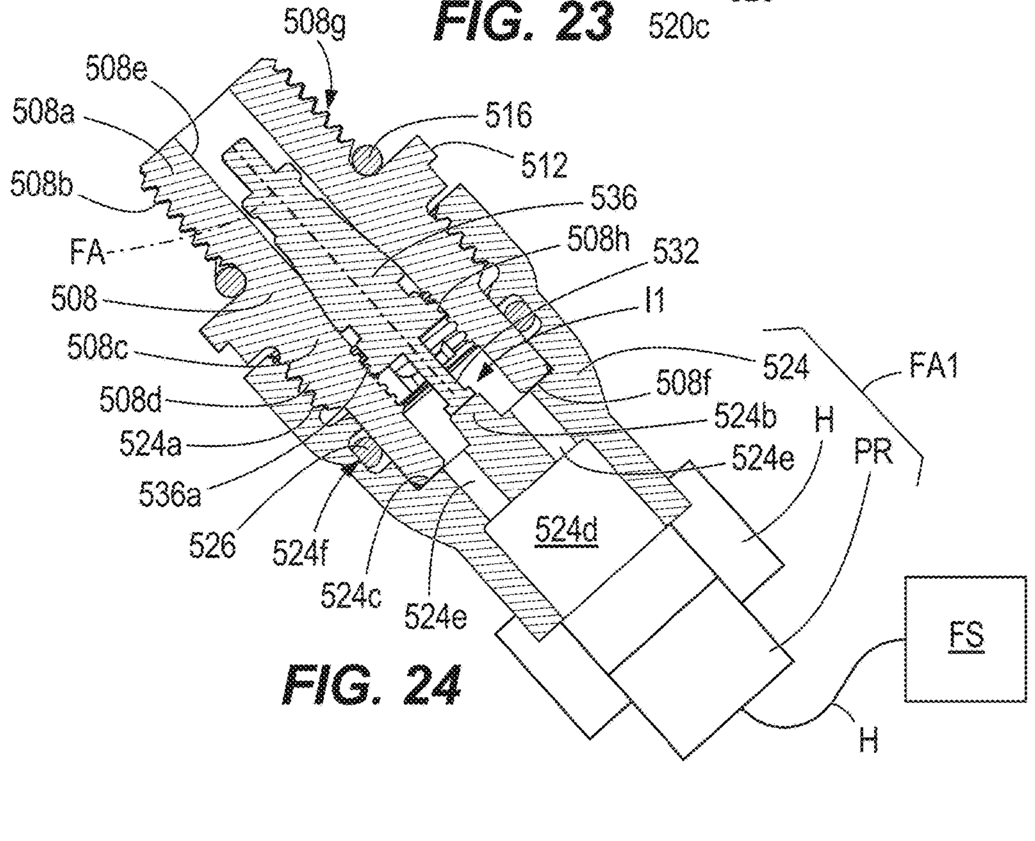
FIG. 24 is a cross-sectional view of the fitting of FIG. 23 and an adapter engaging the fitting.

With reference to FIG. 24, the fill port 500 is further sealed by a valve 528 (e.g., a Schrader valve) including a valve stem 532 and a valve core 536. The valve 528 may be positioned within the fill port 500 (and in some cases, more specifically, within the connector 508). The valve core 536 may include threads 536*a* that engage interior threads 508*h* of the bore 508*e*. The valve core 536 may be held stationary relative to the bore 508*e* by engagement of the threads 536*a*, and interior threads 508*h* or any other engagement (e.g., press fit, adhesive, etc.). The valve stem 532 may be movable relative to the valve core 536 between an open position whereby fluid is permitted to pass through the valve 528 and the fill port 500, and a closed position whereby fluid is inhibited from passing through the valve 528 and the fill port 500. The valve 528 may be movable between its open position and its closed position upon engagement and disengagement of the adapter 524 with the outer-side threads 508*d* (i.e., the first connector). The illustrated valve 528 is a Schrader valve. However, other types of valves 528 are possible. For example, in other embodiments, the valve 528 may be a one-piece valve that is held in a closed position by pressure applied by gas within the storage chamber 336 and movable to an open position by insertion of a tip into the one-piece valve. The illustrated valve stem 532 may be biased by a spring within the valve 528 toward the closed position. The open position of the valve stem 532 may correspond with a depressed position into the valve core 536 whereby a passageway between the valve stem 532 and the valve core 536 is present.

With continued reference to FIG. 24, the adapter 524 (i.e., a first adapter) is generally annular in shape and includes internal threads 524*a* attachable to the outer-side threads 508*d* of the connector 508. The adapter 524 further includes an adapter tip 524*b* and a radially inwardly extending shoulder 524*c*. With the adapter 524 fully attached to the connector 508, the shoulder 524*c* may abut against the outboard axial end surface 508*f* of the connector 508, and the adapter tip 524*b* may depress the valve stem 532 by an amount corresponding with interference I1. The interference I1 represents movement of the valve stem 532 between its closed position and its open position. The adapter 524 further includes a primary fill passageway 524*d* and at least one secondary fill passageway 524*e*. In the illustrated embodiment, two secondary fill passageways 524*e* are present on opposite sides of the filling axis FA. The secondary fill passageways 524*e* simply interconnect the primary fill passageway 524*d* with the bore 508*e* when the adapter 524 is attached to the connector 508. Once the adapter 524 is connected to the connector 508, fluid (e.g., gas) from an external fluid source FS may be passed from the primary fill passageway 524*d*, into the secondary fill passageway 524*e*, and through the valve 528 into the storage chamber 336. The adapter 524 further includes a o-ring receptacle 524*f* (i.e., seal receptacle) capable of receiving a fill adapter o-ring 526 (i.e., fill adapter seal). In the illustrated embodiment, the fill adapter o-ring 526 surrounds the filling axis FA and is generally circular in cross-section. In other embodiments, the fill adapter o-ring 526 may be positioned in other locations relative to the filling axis FA, and may include one or more flat surfaces (i.e., the fill adapter o-ring 526 may be non-circular in cross-sectional shape). In the illustrated embodiment, the o-ring receptacle 524*f* (i.e., seal receptacle) is positioned on a radial inner surface of the adapter 524.

When the adapter 524 is attached to the connector 508, the fill adapter o-ring 526 functions as a seal between the adapter 524 and the connector 508. Because the fill adapter o-ring 526 is positioned between the radial outer surface 508*g* and the o-ring receptacle 524*f* at a radial inner surface of the adapter 524, the fill adapter o-ring 526 may be described as a radially outboard seal. In other embodiments, sealing components between the adapter 524 and connector 508 may be located in different outboard positions. The fill adapter o-ring 526 may be repositioned and/or duplicated, for example, to an axially outboard location between the outboard axial end surface 508*f* and the shoulder 524*c*. In contrast, a location of the fill adapter o-ring 526 between the radial outer surface 508*g* or any other sealing element within the bore 508*e* may be described as an inboard seal internal to the connector 508.

Relative dimensions of the adapter 524 and connector 508 cause, during connection of the adapter 524 to the connector 508, a seal to be formed between the adapter 524 and connector 508 before the adapter 524 actuates the valve stem 532. More specifically, axial lengths and positions of the threads 524*a*, the outer-side threads 508*d*, fill adapter o-ring 526 (i.e., fill adapter seal), and the adapter tip 524*b* are dimensioned such that the fill adapter o-ring 526 seals against the connector 508 before the adapter tip 524*b* actuates (e.g., compresses) the valve stem 532.

Fluid passing from the external fluid supply FS may pass through one or more hoses H (e.g., flexible hoses) to a pressure regulator PR and ultimately to the adapter 524 and the storage chamber 336. The pressure regulator PR regulate the pressure supplied by the external fluid supply FS to a desired fill pressure. As schematically illustrated in FIG. 24, the pressure regulator PR may be positioned at an intermediate location in a supply line receiving external fluid from the external fluid source FS by a hose H and passing regulated pressure to another hose H and the adapter 524. In other embodiments, the pressure regulator PR may be positioned adjacent the external fluid source FS (e.g., without a hose H between the external fluid source FS and the pressure regulator PR), immediately adjacent the adapter 524 (e.g., without a hose H between the pressure regulator PR and the adapter 524), and/or at any location in the supply line between the external fluid source FS and the storage chamber 336.

The adapter 524, hose H, and pressure regulator PR may be considered a first fill adapter FA1, which is connectable to the connector 508. The first fill adapters FA1 is connectable to the connector 508 (i.e., a first connector) and thus the fill port 500 to supply regulated pressurized gas from the external fluid supply FS to the storage chamber 336. Different fill adapters 524 (i.e., second adapters) with different or similar hoses H and pressure regulators PR maybe considered second fill adapters (not shown).

The plug 520 may be attached to the connector 508 during normal operation of the gas spring-powered fastener driver 300, and the adapter 524 may be attached to the connector 508 during a filling or refilling operation. To further inhibit accidental access of the plug 520 during normal operation of the gas spring-powered fastener driver 300, a cap 530 may be secured to the housing 308 by a fastener 534. The fastener 534 may be required to be loosened or removed from the housing 308 prior to removal of the cap 530 for a user to access the recess 520*c* by insertion of a tool (e.g., the Allen key) into the housing 308. In the illustrated embodiment, the cap 530 is located on a handle portion 308*a* of the housing 308. The cap 530 may be selectively coupled to the housing 308 to selectively enclose the fill port 500 when the adapter 524 is not connected with the first connector (the outer-side threads 508*d*).

Figure 25:
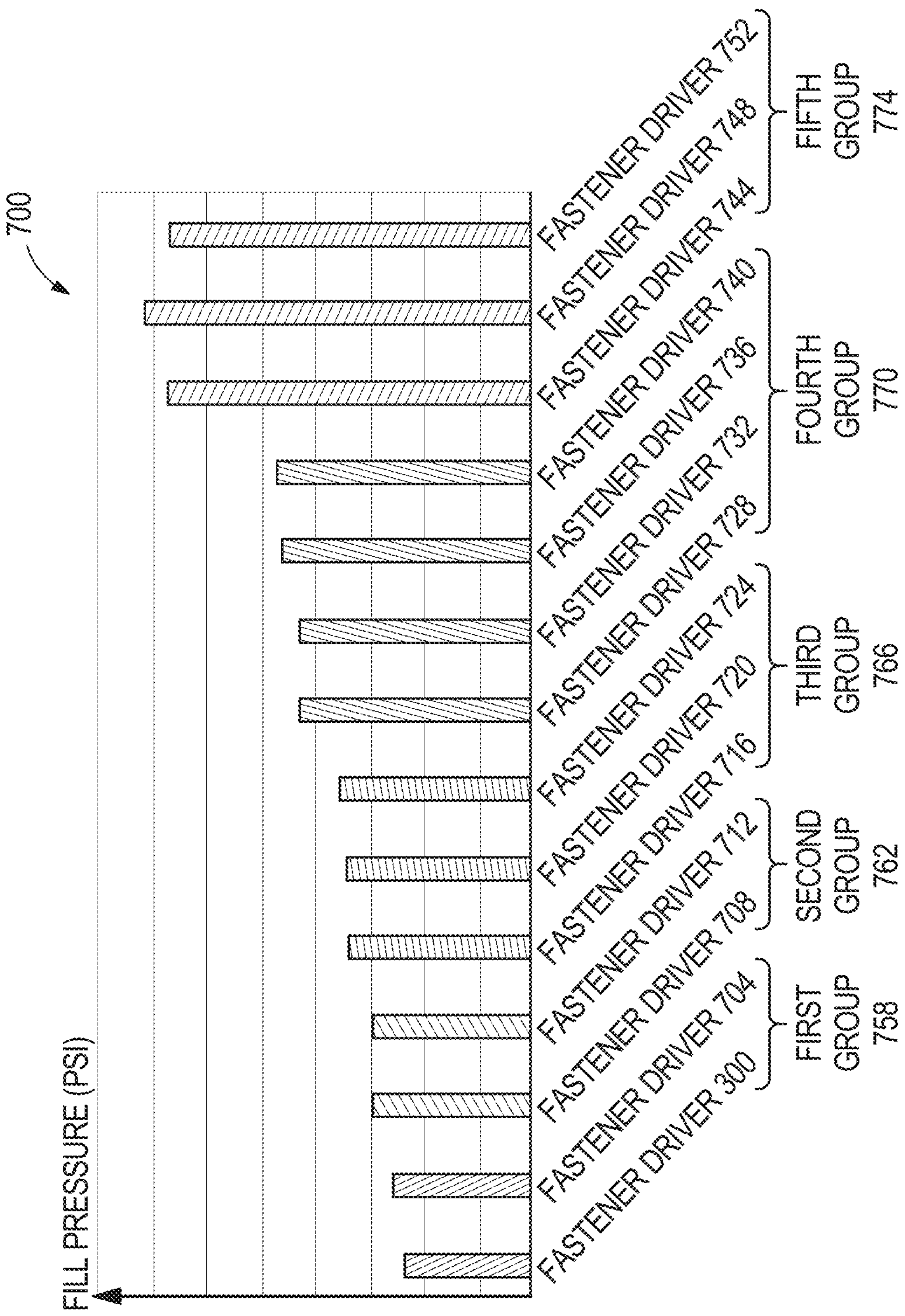
FIG. 25 is a graphical representation of fill pressures of a plurality of fastener drivers as separated into groups compatible for engagement by different adapters.

With reference to FIG. 25, a powered fastener driver system 700 may include a plurality of fastener drivers 300, 704, 708, 712, 716, 720, 724, 728, 732, 736, 740, 744, 748, 752. Fastener drivers 300, 704, 708, 712, 716, 720, 724, 728, 732, 736, 740, 744, 748, 752 may be grouped into a first group 758, second group 762, third group 766, fourth group 770, and fifth group 774 depending on target fill pressure requirements of the individual fastener driver, with like fastener drivers being grouped together. Each of the fastener drivers 704, 708, 712, 716, 720, 724, 728, 732, 736, 740, 744, 748, 752 may include features and operate like the fastener drivers 100, 300.

The adapter 524 (i.e., first adapter of first fill adapter FA1) may be attachable with a connector (e.g., the connector 508, the "first connector") onboard the fastener driver 300 and/or the same connector (e.g., outer-side threads 508*d*) onboard the fastener driver 704. The same adapter 524 (i.e., first adapter of first fill adapter FA1) may be attachable to both the fastener driver 300 and the fastener driver 704 to supply pressurized gas from the external fluid supply to either the storage chamber 336 or a similar storage chamber onboard the fastener driver 704. Fastener drivers classified in the same group (e.g., the first group 758) may include similar connectors (e.g., the first connector, connector 508) for engaging the same adapter 524 (i.e., first adapter of first fill adapter). Different fill adapters (e.g., second fill adapters) with different adapters, in other words, second adapters 524 that are similar to but different from adapter 524, for example including differing internal threads 524*a*, can be dimensioned as incompatible with the first connector of the fill port 500. For example, the second adapter 524 internal threads 524*a* may be incompatible with the outer-side threads 508*d* thereby preventing the second adapter 524 from supplying pressurized gas from the external fluid supply to the storage chamber 336 onboard the fastener driver 300 or the fastener driver 704.

Further, different fastener drivers (e.g., fastener drivers 708, 712) in different groups (e.g., the second group 762) may include connectors 508 (e.g., second connectors), for example with outer-side threads 508*d* that differ from the outer side threads 508*d* of the fastener drivers 300, 704, such that the second adapters (i.e., second adapters, adapters 524 with differing internal threads 524*a*) are attachable to the selected fastener driver (708, 712).

In the illustrated embodiment, the first connector 508 may have a first thread pattern (outer-side threads 508*d* of fastener driver 300), and the first adapter 524 may have a second thread pattern (internal threads 524*a* of first adapter 524) dimensioned to engage the first thread pattern, whereas the second adapter (internal threads 524*a* of second adapter 524) may be dimensioned as incapable of engagement with the first thread pattern. The thread patterns may differ in any one or more of minor diameter, major diameter, depth, pitch, pitch diameter, helix angle, thread width, thread angle, length of root, and the like. In other embodiments, other types of mechanical structure differing from dimensions of threads may be used to selectively permit and/or render incompatible and inhibit connection between the fill port 500 (e.g., of fastener driver 300 and the first group 758) with the fill port 500 of other groups (the second through fifth groups 762, 766, 770, 774). For example, inner and outer diameters of the fill port 500, connectors 508, and fill adapters 524 may be dimensioned to selectively permit and/or render incompatible and inhibit connection between the fill port 500 and the fill adapter 524 in comparison with the fill port 500 of other groups (the second through fifth groups 762, 766, 770, 774). In other embodiments, type and/or size of a quick connect coupling may selectively permit and/or render incompatible and inhibit connection between the fill port 500 and the fill adapter 524 in comparison with the fill port 500 of other groups (the second through fifth groups 762, 766, 770, 774).

Dimensions or other compatibility features between the fill port 500 and fill adapters 524 may be selected to permit desired types of fill adapters 524 from connecting with desired types of fill ports 500. For example, if desired, an adapter 524 typically for use with the outer-side threads 508*d* onboard a fastener driver 708, 712 of the second group 762 may also be attachable (i.e., compatible) with the outer-side threads 508*d* of the fastener drivers 300, 704 of the first group 758 but not of fastener drivers 716, 720, 724 of the third group 766. Various permutations are possible. Various numbers (e.g., one, two, three, four, more than four) of fastener drivers may be present in any given group 758, 762, 766, 770, 774). The illustrated system 700 includes five groups, however, the system 700 may include any number of groups (two, three, four, five, more than five).

Figure 26:
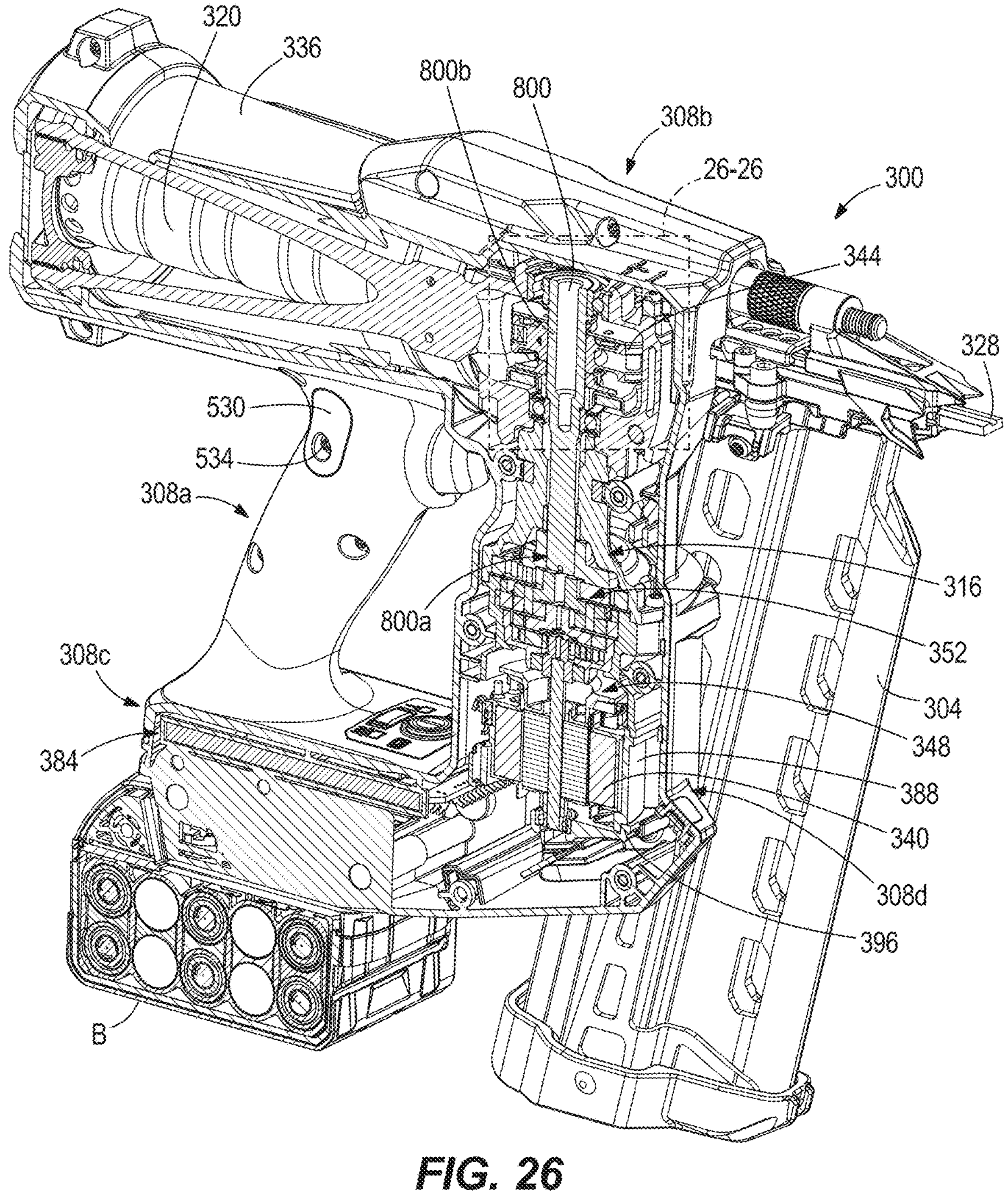
FIG. 26 is a perspective and cross-sectional view of the powered fastener driver of FIG. 18 taken along section line 26-26 in FIG. 19.
Figure 27:
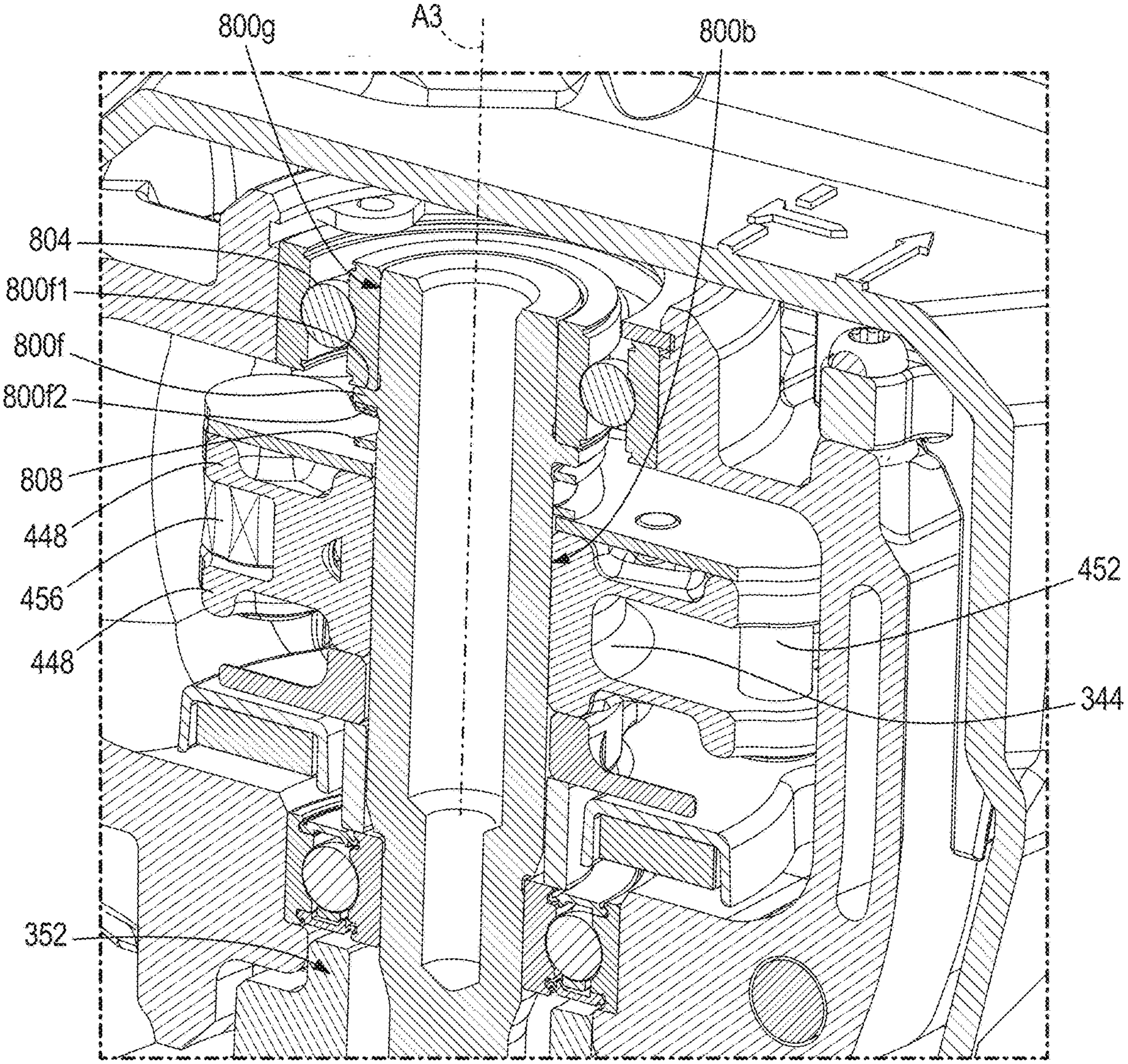
FIG. 27 is an enlarged perspective and cross-sectional view of the powered fastener driver of FIG. 18 taken along section line 27-27 in FIG. 26.
Figure 28:
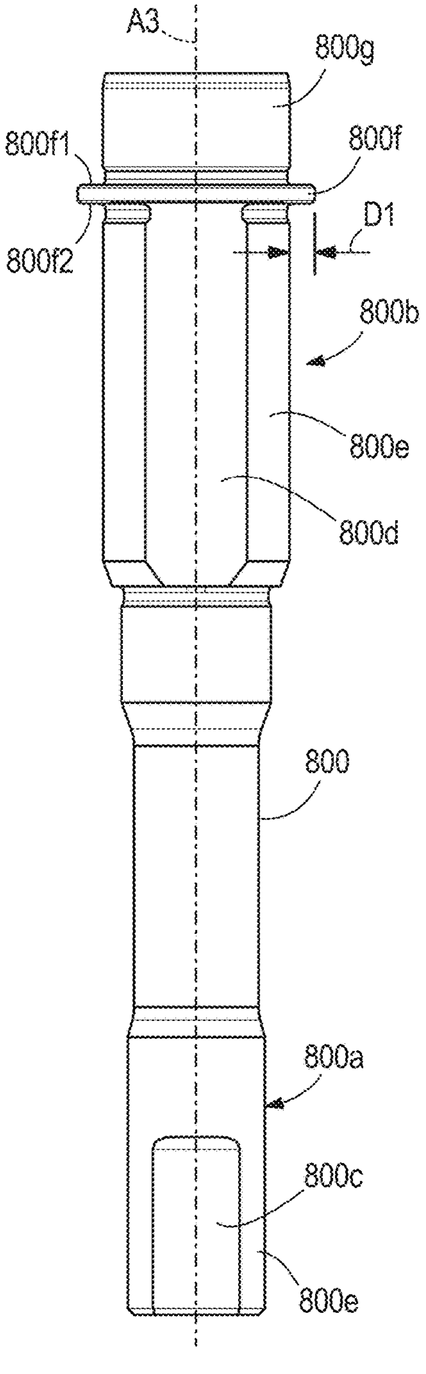
FIG. 28 is a side view of a drive shaft of the powered fastener driver of FIG. 27.
Figure 29:
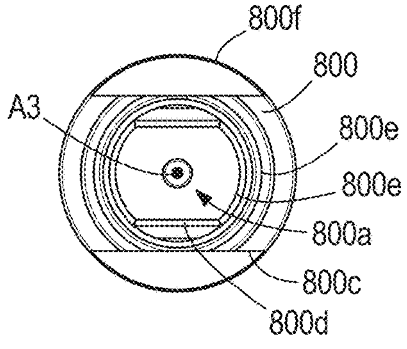
FIG. 29 is an end view of the drive shaft of the powered fastener driver of FIG. 27.
Figure 30:
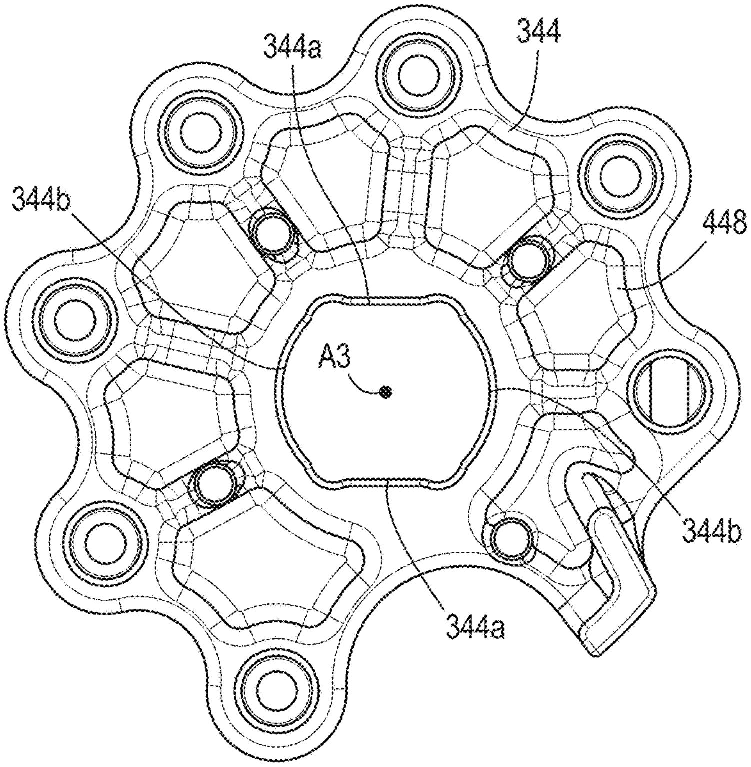
FIG. 30 is an end view of a rotary lifter flange of the powered fastener driver of FIG. 27.

FIGS. 26 and 27 illustrate a drive shaft 800 extending along a drive shaft axis A3 that does not intersect (i.e., is non-intersecting) with the driving axis A1 as defined by the driver blade 328 (i.e., the driver blade axis A1). The drive shaft 800 is coupled to and configured to receive torque from the motor 340. In some embodiments and as similar to the fastener driver 100, the fastener driver 300 may include a one-way clutch 348 and a transmission 352, such as a planetary transmission, disposed between the motor 340 and the drive shaft 800. The drive shaft 800 includes an input end 800*a* connected to the one-way clutch 348, transmission 352, and motor 340 and an output end 800*b* connected to a rotary lifter 344. The rotary lifter 344 may include features similar to the rotary lifter 144.

With reference to FIGS. 27-30, the drive shaft 800 includes a pair of input flat portions 800*c* and a pair of output flat portions 800*d* each adjacent a pair of arcuate portions 800*e* near the input end 800*a* and output end 800*b*, respectively. The input flat portions 800*c* and output flat portions 800*d* each provide two flat planar surfaces between pairs of opposing arcuate portions 800*e* that surround the drive shaft axis A3. Any number of input flat portions 800*c* and output flat portions 800*d* may be present so long as torque is capable of being transmitted from the one-way clutch 348, transmission 352, and motor 340 via the drive shaft 800 to a corresponding shaped engagement surface 344*a* of the rotary lifter 344. Torque is transmitted through each of the input flat portions 800*c* and the output flat portions 800*d* to the engagement surface 344*a* of the rotary lifter 344. The illustrated rotary lifter 344 further includes arcuate engagement surfaces 344*b* mirroring the shape of the arcuate portion 800*e*. The drive shaft 800 can provide torque to the rotary lifter 344 to return the driver blade 328 from the BDC position toward the TDC position.

The drive shaft 800 further includes a shoulder 800*f* extending radially outward from the arcuate portions 800*e* near the output end 800*b*. The shoulder 800*f* projects a distance D1 from the arcuate portions 800*e* as measured perpendicular to the drive shaft axis A3. The output end 800*b* of the drive shaft 800 further includes a bearing support surface 800*g* which is cylindrical in shape. The bearing support surface 800*g* is smaller in outer diameter in comparison with the shoulder 800*f*. With reference to FIG. 27, a bearing 804 is secured to the bearing support surface 800*g* (e.g., by press fit). The bearing 804 abuts a first side 800*f*1 of the shoulder 800*f*.

A spring 808 (i.e., biasing member) is positioned between the shoulder 800*f* and an upper plate 448 (i.e., flange 448, upper as viewed in FIG. 27) of the rotary lifter 344. More specifically, the spring 808 is positioned between a second side 800*f*2 of the shoulder 800*f* and the plate 448. The spring 808 applies an axial biasing force along the drive shaft axis A3 to the rotary lifter 344 to bias the rotary lifter toward an axial home position whereby the rotary lifter 344 is positioned at a height along the drive shaft axis A3 aligned with the driver blade axis A1 and thus the driver blade 328, and where the driver blade 328 is capable of engaging the lift pins 452 of the rotary lifter 344. The spring 808 may be a compression spring, a leaf spring, or the like. The spring 808 may comprise one or more separate spring members.

Figure 31:
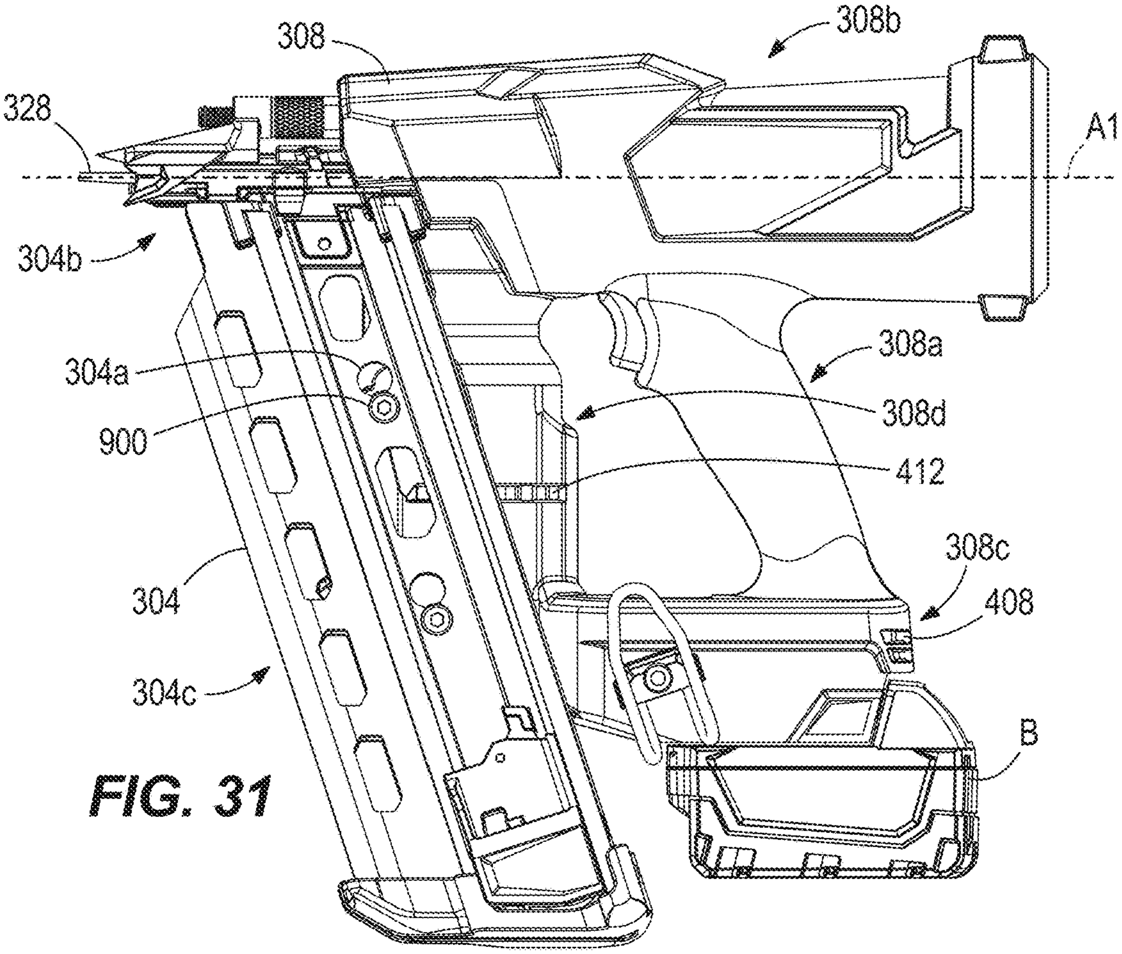
FIG. 31 is a second side view of the powered fastener driver of FIG. 18.

FIGS. 31-34 illustrate a fastener 900 that secures the magazine 304 to the housing 308 and an irregular quadrilateral gear case bolt pattern 904 affording the fastener 900 space to engage the housing 308. In the illustrated embodiment, the fastener 900 is a threaded fastener such as a bolt or screw. However, other fasteners (e.g., quick-connect fingers or snap) may be used. As illustrated in FIG. 31, the fastener 900 may extend through a bore 304*a* of the magazine 304 at an intermediate position along the magazine 304 between a proximal end 304*b* closest to the driver blade axis A1 and a distal end 304*c* thereof. The proximal end 304*b* of the magazine 304 feeds fasteners into alignment with the driver blade 328.

Figure 32:
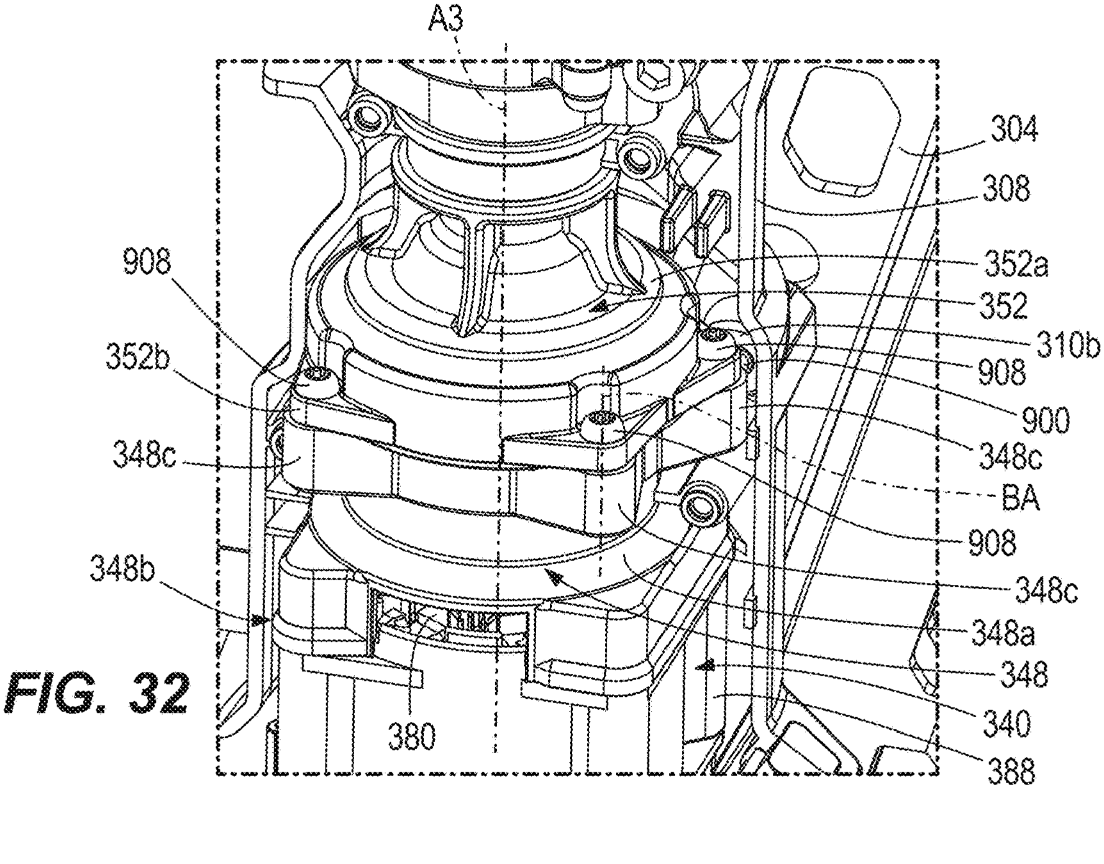
FIG. 32 is an enlarged partial cutaway view of the powered fastener driver of FIG. 18 as taken from section line 32-32 in FIG. 19.
Figure 33:
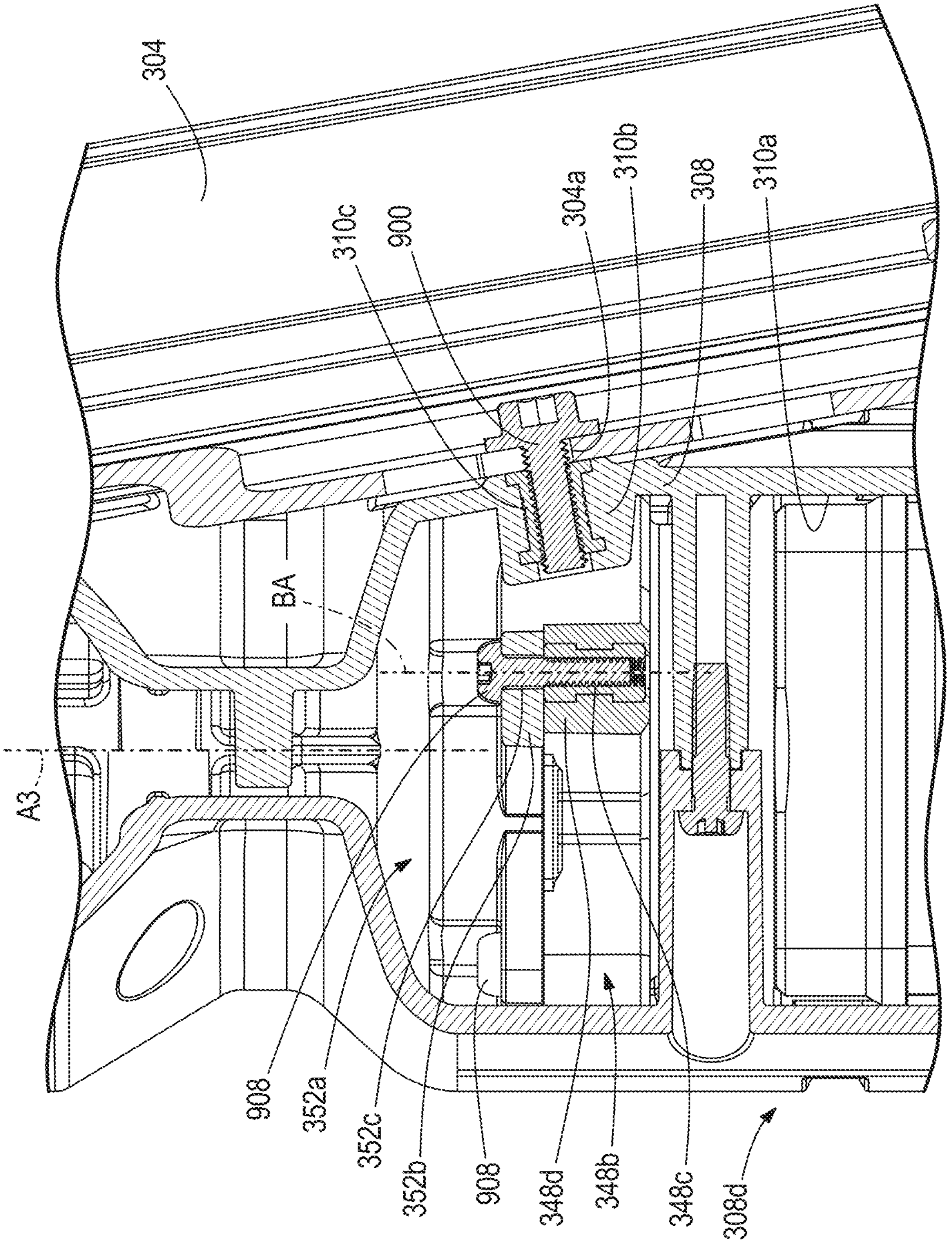
FIG. 33 is a front cross-sectional view of the fastener driver of FIG. 18 taken along section line 33-33 in FIG. 22.
Figure 34:
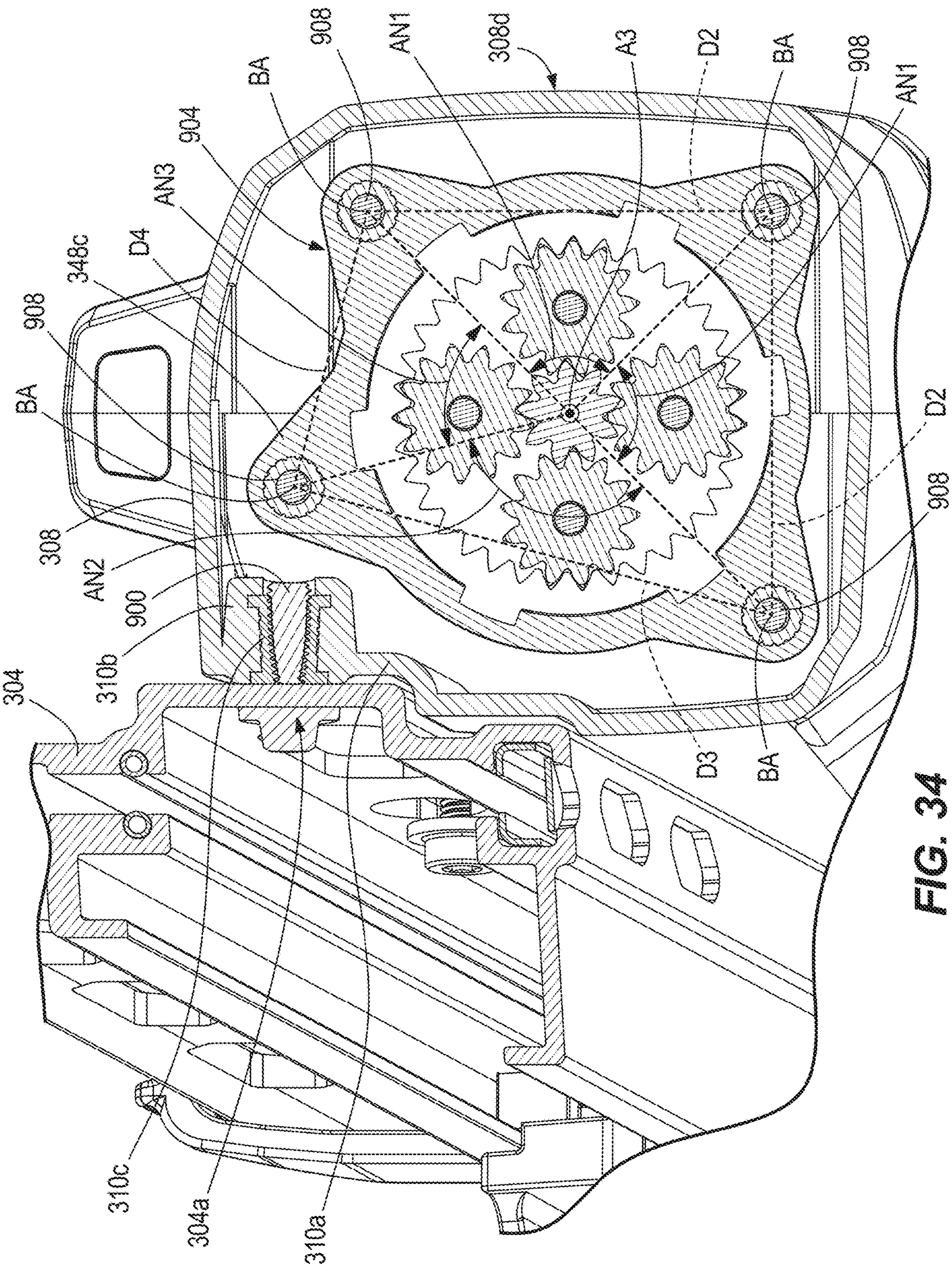
FIG. 34 is a cross-sectional view of the fastener driver of FIG. 18 taken along section line 34-34 in FIG. 18.

As illustrated in FIGS. 32-34, the bolt pattern 904 includes four bolts 908. Each bolt 908 is oriented along a bolt axis BA parallel to the drive shaft axis A3. The bolts 908 interconnect a clutch housing 348*a* within which the one-way clutch 348 is positioned to a transmission housing 352*a* within which the transmission 352 is positioned. The motor housing 388 within which the motor 340 is positioned is coupled to the clutch housing 348*a*. The housing 38 and clutch housing 348*a* may together be referred to as a motor case 348*b*. Also, since the transmission housing 352*a* includes gears, the transmission housing 352*a* may be referred to as a gear case 352*a*. The motor case 348*b* may be generally cylindrical in shape, and further include bump outs 348*c* that project radially outwardly from the generally cylindrical motor case 348*b*. Each bump out 348*c* may include a bore 348*d* configured to receive one of the bolts 908. The gear case 352*a* may also be generally cylindrical in shape, and further include bump outs 352*b* that project radially outwardly from the generally cylindrical gear case 352*a*. Each bump out 352*b* may include a bore 352*c* configured to receive one of the bolts 908.

FIGS. 33 and 34 illustrate the fastener 900 as extending through the bore 304*a* into the interior of the housing 308. The housing 308 includes a sidewall inner surface 310*a* and a projection 310*b* extending inwardly from the sidewall inner surface 310*a* into the housing 308. The projection 310*b* includes a magazine fastener receptacle 310*c* that is engaged by the fastener 900 to secure the magazine 304 to the housing 308. The magazine fastener receptacle 310*c* extends inwardly from the sidewall inner surface 310*a* along the projection 310*b*. By locating the projection 310*b* in the interior of the housing 308, the lateral width of the fastener driver 300 including the magazine 304 is reduced in comparison with known fastener drivers.

FIG. 34 illustrates the gear case bolt pattern 904 in detail. The gear case bolt pattern has an irregular quadrilateral shape in a plane perpendicular to the drive shaft axis A3 (which is itself coaxial to the motor 340, and thus a motor axis). The illustrated irregular quadrilateral shape includes two regular included angles AN1 measured between two adjacent reference lines each extending from the drive shaft axis A3 and through the bolt axis BA of a corresponding bolt 908. The regular included angles AN1 are equal to 90 degrees. The term 'regular' refers to a typical angle expected for the selected number of bolts 908 in the gear case bolt pattern 904 includes four bolts 908 around a 360-degree perimeter of the gear case 352*a*. A typical angle expected for a gear case bolt pattern 904 including four bolts would be 360 degrees/4 bolts or 90 degrees. In other embodiments, the angles AN1 may differ, and none of the angles AN1 may be described as 'regular'. The irregular quadrilateral shape includes at least one obtuse included angle AN2 measured between two adjacent gear case bolts 908 and the drive shaft axis A3 that is greater than 90 degrees. The irregular quadrilateral shape includes at least one acute included angle AN3 measured between two adjacent gear case bolts 908 and the drive shaft axis that is less than 90 degrees. The resultant shape locates at least one of the bolts 908 further inboard (laterally closer to the drive shaft axis A3) within the housing 308 to provide space for the projection 310*b* and fastener 900. Note that the three bolts 908 defining the two regular included angles AN1 are spaced from one another a distance D2. The two bolts 908 defining the obtuse included angle AN2 are spaced from one another a distance D3 greater than distance D2. The two bolts 908 defining the obtuse include angle AN3 are spaced from one another a distance D4 smaller than the distance D2. The distances D2-D4 are illustrated as straight lines extending between bolt axes BA. However, similar statements can be made for the arc lengths between bolts 908 as reflected by the distances D2-D4.

Other irregular quadrilateral shapes for the gear case bolt pattern 904 are possible. Similarly, other irregular non-quadrilateral shapes for the gear case bolt pattern 904 are possible. For example, fewer (one, two, three) or greater (more than four) bolts 908 may be present. For example, with a gear case bolt pattern 904 including five bolts, a regular bolt pattern would arrange the bolts (360 degrees/5 bolts) spaced a regular included angle of 72 degrees apart from one another, resulting in a distance between bolt axes BA between each of the five bolts 908 to be equal (like distance D2 above but between each of the five bolts). An irregular bolt pattern is envisioned whereby at least one of the five bolts 908 is positioned with a smaller than regular (i.e., typical, evenly circumferentially spaced) spacing (e.g., less than 72 degrees) and at least one of the bolts is positioned with a larger than typical angular spacing (e.g., greater than 72 degrees).

Figure 35:
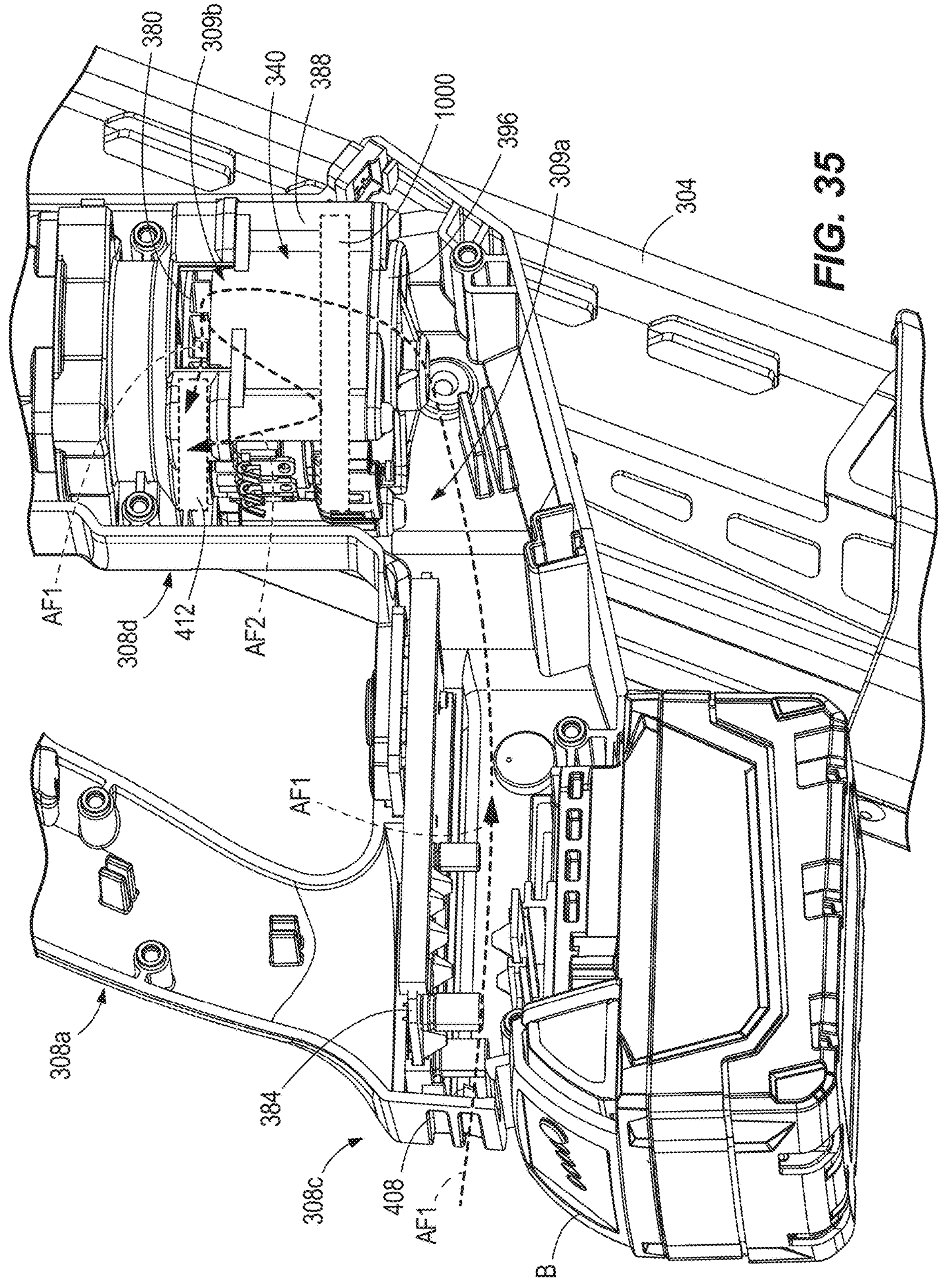
FIG. 35 is a perspective, partial cutaway view of the powered fastener driver of FIG. 18, with a divider positioned within the housing.

FIG. 35 illustrates an alternate airflow path through the housing 308 of the fastener driver 300 as limited by a divider 1000. The housing 308 includes, as mentioned above, a handle portion 308*a*, a cylinder portion 308*b*, a battery receptacle portion 308*c* configured to receive the battery pack B, and a motor housing portion 308*d* within which the motor 340 is positioned. The battery pack B may be coupled to the battery receptacle portion 308*c* to supply electrical current to the motor 340. The housing 308 is split between an intake region 309*a* and an exhaust region 309*b* by the divider 1000. The intake region 309*a* includes an airflow inlet 408. The illustrated airflow inlet 408 is located at a rear end of the battery receptacle portion 308*c*. The airflow inlet 408 may be an inlet grate with a plurality of separated inlets. The exhaust region 309*b* includes an airflow outlet 412. In the illustrated embodiment, two airflow outlets 412 are present on each lateral side of the motor housing portion 308*c* (e.g., the left (FIG. 31) and right (FIG. 18) sides of the motor housing portion 308*c* as split by a forward-rearward reference plane passing through the drive axis A3). The airflow outlets 412 may be positioned at an axial height along the drive shaft axis A3 in correspondence with the axial height of the fan 380. In other words, the airflow outlet 412 is positioned on the motor housing portion 308*c* in communication with the exhaust region 309*b*. The divider 1000 is positioned within the housing 308 between the motor 340 (i.e., the motor housing 388) and the motor housing portion 308*c*. The divider 1000 may be a separate component to the housing 308 and motor 340. Alternatively, the divider 1000 may be integrally formed as a single piece with either of the housing 308 or the motor 340. The divider may inhibit passage of cooling airflow exhausted from fan 380 in the exhaust region 309*b* from reentering the intake region 309*a*. In some embodiments, the divider 1000 may be made of a foam material. The divider 1000 may be made of a compliant material capable of being deflected. The fan 380 itself may be positioned within the exhaust region 309*b*.

With reference to FIG. 35, upon activation of the motor 340, the fan 380 may generate a cooling airflow as indicated by path AF1 that enters the airflow inlet 408 and cools the controller 384 and optionally terminals of the battery pack B, before entering the shroud 396 and cooling the motor 340. In some embodiments, the shroud 396 may be removed. After passing through the motor 340, the cooling airflow AF1 enters the exhaust region 309*b* and exits the housing 308 by passing through the airflow outlet 412. However, some particles of air may be directed along redirected path AF2 back toward the intake region 309*a*. The redirected path AF2 impacts the divider 1000, which redirects the redirected path AF2 toward the airflow outlet 412 thereby inhibiting backflow of heated air generated by the fan 380 from reentering the motor 340.

Various features of the invention are set forth in the following claims.

What is claimed is:

1. A powered fastener driver comprising:
- a driver blade movable from a top-dead-center position to a bottom-dead-center position for driving a fastener into a workpiece; and
- a lifting assembly for providing torque to move the driver blade from the bottom-dead-center position toward the top-dead-center position, the lifting assembly including
  - a rotary lifter configured to be selectively engageable with the driver blade, the rotary lifter having a plurality of lift pins and a roller disposed on at least one of the lift pins, and
  - a motor configured to provide torque to the rotary lifter;
- wherein the roller includes a plurality of cam portions defined by cup-shaped recesses having a first radius oriented parallel to a rotational direction of the roller and a second radius perpendicular to the first radius, and
- wherein the driver blade includes a lift tooth having a crown disposed thereon, the crown configured to be engaged with at least one of the plurality of cam portions.

2. The powered fastener driver of claim 1, wherein the crown is defined by a crown radius oriented perpendicular to a driving axis of the driver blade, and wherein the crown radius is smaller than the second radius of the at least one of the plurality of cam portions.

3. The powered fastener driver of claim 1, further comprising a pressure vessel in which a pressurized gas is maintained, a housing in which the pressure vessel and the lifting assembly are disposed, and a damper positioned between the pressure vessel and the housing.

4. The powered fastener driver of claim 3, wherein the damper is a first damper and the powered fastener driver further comprises a second damper positioned between the pressure vessel and the housing, the first damper and the second damper supported by a first flange and a second flange respectively, and are positioned asymmetric relative to one another about a plane containing an axis along which the driver blade is movable.

5. The powered fastener driver of claim 1, wherein the lifting assembly includes a motor positioned within a motor case and a gear train positioned within a gear case, the motor being oriented along a motor axis.

6. The powered fastener driver of claim 5, further comprising a plurality of gear case bolts connecting the gear case and the motor case, the gear case bolts arranged in a gear case bolt pattern having an irregular quadrilateral shape as viewed perpendicular to the motor axis.

7. The powered fastener driver of claim 6, wherein the quadrilateral shape includes at least one obtuse included angle measured between two adjacent gear case bolts and the motor axis greater than 90 degrees and at least one acute included angle less than 90 degrees.

8. The powered fastener driver of claim 7, wherein the quadrilateral shape includes at least one included angle equal to 90 degrees.

9. A powered fastener driver comprising:
- a pressure vessel in which a pressurized gas is maintained;
- a piston movable within the pressure vessel from a top-dead-center (TDC) position to a bottom-dead-center (BDC) position by the pressurized gas;
- a driver blade coupled for movement with the piston from the TDC position to the BDC position for driving a fastener into a workpiece;
- a lifting assembly configured to selectively engage the driver blade to move the driver blade from the BDC position toward the TDC position;
- a housing in which the pressure vessel and the lifting assembly are disposed,
- a first damper positioned between the pressure vessel and the housing; and
- a second damper positioned between the pressure vessel and the housing;
- wherein the first damper and the second damper are positioned asymmetric relative to one another about a plane containing an axis along which the driver blade is movable; and
- wherein the first damper and the second damper are configured to dampen movement of the pressure vessel relative to the housing.

10. The powered fastener driver of claim 9, further comprising a plurality of gear case bolts connecting a gear case to a motor case, the gear case bolts arranged in a gear case bolt pattern having an irregular quadrilateral shape as viewed perpendicular to a motor axis of a motor within the motor case.

11. The powered fastener driver of claim 10, wherein the quadrilateral shape includes at least one obtuse included angle measured between two adjacent gear case bolts and the motor axis greater than 90 degrees and at least one acute included angle less than 90 degrees.

12. The powered fastener driver of claim 11, wherein the lifting assembly includes a rotary lifter configured to be selectively engageable with the driver blade, the rotary lifter having a plurality of lift pins and a roller disposed on at least one of the lift pins, wherein the roller includes a plurality of cam portions defined by cup-shaped recesses having a first radius oriented parallel to a rotational direction of the roller and a second radius perpendicular to the first radius, and wherein the driver blade includes a lift tool having a crown disposed thereon, the crown configured to be engaged with at least one of the plurality of cam portions.

13. The powered fastener driver of claim 9, wherein the lifting assembly includes a rotary lifter configured to be selectively engageable with the driver blade, the rotary lifter having a plurality of lift pins and a roller disposed on at least one of the lift pins.

14. The powered fastener driver of claim 13, wherein the roller includes a plurality of cam portions defined by cup-shaped recesses having a first radius oriented parallel to a rotational direction of the roller and a second radius perpendicular to the first radius.

15. The powered fastener driver of claim 14, wherein the driver blade includes a lift tool having a crown disposed thereon, the crown configured to be engaged with at least one of the plurality of cam portions.

16. A powered fastener driver comprising:

a pressure vessel in which a pressurized gas is maintained;

a piston movable within the pressure vessel from a top-dead-center (TDC) position to a bottom-dead-center (BDC) position by the pressurized gas;

a driver blade coupled for movement with the piston from the TDC position to the BDC position for driving a fastener into a workpiece;

a lifting assembly operable to move the driver blade from the BDC position toward the TDC position, the lifting assembly including a motor positioned with a motor case and a gear train positioned within a gear case, the motor being oriented along a motor axis; and a plurality of gear case bolts connecting the gear case and the motor case, the gear case bolts arranged in a gear case bolt pattern having an irregular quadrilateral shape as viewed perpendicular to the motor axis;

a housing defining an interior surface within which the lifting assembly is positioned, the housing including a projection extending inwardly of the interior surface; and a magazine coupled to the housing by a magazine fastener that engages a magazine fastener receptacle in the projection;

wherein the quadrilateral shape includes at least one obtuse included angle measured between two adjacent gear case bolts and the motor axis greater than 90 degrees and at least one acute included angle less than 90 degrees.

17. The powered fastener driver of claim 16, wherein the quadrilateral shape includes at least one included angle equal to 90 degrees.

18. The powered fastener driver of claim 16, wherein the magazine includes a magazine bore that receives the magazine fastener, the magazine bore positioned at an intermediate position between a proximal end of the magazine that feeds fasteners into alignment with the driver blade and an opposite distal end of the magazine.

19. The powered fastener driver of claim 16, wherein the magazine is angled in a non-perpendicular manner relative to a driving axis along which the driver blade is movable.

* * * * *